US010514887B2

(12) United States Patent
Thagadur Shivappa et al.

(10) Patent No.: US 10,514,887 B2
(45) Date of Patent: Dec. 24, 2019

(54) MULTIMEDIA DEVICE FOR PROCESSING SPATIALIZED AUDIO BASED ON MOVEMENT

(71) Applicant: QUALCOMM Incorporated, San Diego, CA (US)

(72) Inventors: Shankar Thagadur Shivappa, San Diego, CA (US); Martin Morrell, Leeds (GB); S M Akramus Salehin, San Diego, CA (US); Dipanjan Sen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/148,837

(22) Filed: Oct. 1, 2018

(65) Prior Publication Data

US 2019/0042182 A1 Feb. 7, 2019

Related U.S. Application Data

(63) Continuation of application No. 15/233,767, filed on Aug. 10, 2016, now Pat. No. 10,089,063.

(51) Int. Cl.
*G06F 3/16* (2006.01)
*H04R 5/02* (2006.01)
(Continued)

(52) U.S. Cl.
CPC .............. *G06F 3/165* (2013.01); *G06F 3/011* (2013.01); *G06F 3/012* (2013.01); *G06F 3/0346* (2013.01);
(Continued)

(58) Field of Classification Search
CPC ........ G06F 3/011; G06F 3/012; G06F 3/0346; G06F 3/16; G06F 3/165; H04R 3/00;
(Continued)

(56) References Cited

U.S. PATENT DOCUMENTS 6,021,206 A  2/2000  McGrath
6,259,795 B1  7/2001  McGrath
(Continued)

FOREIGN PATENT DOCUMENTS

WO  2014204330 A1  12/2014

OTHER PUBLICATIONS

3DIO: "About: Meet the 3Dio Sound Team Behind the Binaural Microphones," Retrieved on Feb. 23, 2016, Retrieved from http://3diosound.com/pages/about-3dio-binaural, 3 pages.
(Continued)

*Primary Examiner* — Thang V Tran
(74) *Attorney, Agent, or Firm* — Toler Law Group

(57) ABSTRACT

In a particular aspect, a multimedia device is configured to compensate for navigational movement within a visual environment. The multimedia device includes a processor configured to generate a first version of a spatialized audio signal of a sound field in a first audio frame based on a first position within a visual environment. The processor is configured to generate a second version of the spatialized audio signal of the sound field in a second audio frame based on compensating for the speed of movement of the multimedia device that indicates the first position within the visual environment changed to a second position within the visual environment, being different than the speed of movement in changing from a first location of the sound field to a second location of the sound field.

30 Claims, 12 Drawing Sheets

(51) Int. Cl.
*H04S 7/00* (2006.01)
*H04R 3/00* (2006.01)
*G06F 3/01* (2006.01)
*G06F 3/0346* (2013.01)
*G02B 27/01* (2006.01)

(52) U.S. Cl.
CPC .............. *G06F 3/16* (2013.01); *H04R 5/02* (2013.01); *H04S 7/303* (2013.01); *H04S 7/304* (2013.01); *G02B 27/017* (2013.01); *H04R 2499/13* (2013.01); *H04S 2400/11* (2013.01); *H04S 2420/11* (2013.01)

(58) Field of Classification Search
CPC ... H04R 3/12; H04R 5/00; H04R 5/02; H04R 2499/13; H04S 2400/11; H04S 7/303; H04S 7/304; H04S 2420/01; H04S 2420/11; G02B 27/017
See application file for complete search history.

(56) References Cited

U.S. PATENT DOCUMENTS

| | | | |
|---|---|---|---|
| 7,792,674 B2 | 9/2010 | Dalton et al. | |
| 8,190,438 B1* | 5/2012 | Nelissen | G10L 21/00 381/85 |
| 8,315,401 B2 | 11/2012 | Hayakawa et al. | |
| 8,638,946 B1* | 1/2014 | Mahabub | H04S 7/30 381/1 |
| 8,681,997 B2* | 3/2014 | Karaoguz | H04S 7/302 381/17 |
| 9,075,127 B2 | 7/2015 | Hess et al. | |
| 9,084,058 B2 | 7/2015 | Reilly et al. | |
| 2006/0133619 A1* | 6/2006 | Curry | H04M 3/56 381/26 |
| 2009/0046864 A1* | 2/2009 | Mahabub | H04S 7/30 381/17 |
| 2009/0285404 A1 | 11/2009 | Hsu et al. | |
| 2011/0157327 A1 | 6/2011 | Seshadri et al. | |
| 2012/0093320 A1* | 4/2012 | Flaks | H04S 7/301 381/17 |
| 2013/0259238 A1 | 10/2013 | Xiang et al. | |
| 2014/0153751 A1* | 6/2014 | Wells | H04S 7/304 381/303 |
| 2014/0226823 A1 | 8/2014 | Sen et al. | |
| 2014/0270188 A1 | 9/2014 | Hall et al. | |
| 2014/0328505 A1 | 11/2014 | Heinemann et al. | |
| 2015/0010169 A1 | 1/2015 | Popova et al. | |
| 2015/0036848 A1 | 2/2015 | Donaldson | |
| 2015/0058102 A1 | 2/2015 | Christensen et al. | |
| 2015/0221313 A1 | 8/2015 | Purnhagen et al. | |
| 2015/0248889 A1 | 9/2015 | Dickins et al. | |
| 2015/0326966 A1 | 11/2015 | Mehra et al. | |
| 2015/0373471 A1 | 12/2015 | Krueger et al. | |
| 2016/0035356 A1 | 2/2016 | Morrell et al. | |
| 2016/0088417 A1 | 3/2016 | Kim et al. | |
| 2017/0257723 A1* | 9/2017 | Morishita | H04R 5/033 |
| 2017/0295446 A1 | 10/2017 | Thagadur Shivappa | |
| 2018/0035234 A1* | 2/2018 | Roach | H04S 7/303 |
| 2018/0046431 A1 | 2/2018 | Thagadur Shivappa et al. | |

OTHER PUBLICATIONS

3DIO: "Professional Binaural Microphones," Retrieved on Feb. 22, 2016, Retrieved from http://3diosound.com/, 3 pages.

HTC, "Vive", retrieved from the Internet URL: https://www.htcvive.com/us/, on Jul. 22, 2016, pp. 1-6.

International Search Report and Written Opinion—PCT/US2017/038708—ISA/EPO—dated Sep. 29, 2017.

"3d Sound One", 3D Sound Labs—Your everyday Headphones, Reinvented, Retrieved from Internet: http://www.3dsoundlabs.com/produit/casque-audio-3d-sound-one/?lang=fr&lang=en on May 6, 2016, 12 Pages.

"Euler Angles", Wikipedia, the free Encyclopedia, Retrieved from Internet:https://en.wikipedia.org/wiki/Euler_angles on May 6, 2016, 11 Pages.

"Microsoft HoloLens", retrieved from the Internet URL: https://www.microsoft.com/microsoft-hololens/en-us, on Jul. 22, 2016, pp. 1-10.

"PlayStation VR—Virtual Reality Headset for PS4", retrieved from internet URL: https://www.playstation.com/en-us/explore/playstation-vr/ on Jul. 22, 2016, pp. 1-4.

Martz N., "Spatial Audio Comes to the Cardboard SDK", Google Developers Blog, Jan. 13, 2016, Retrieved from Internet: http://googledevelopers.blogspot.ch/2016/01/spatial-audio-comes-to-cardboard-sdk.html on Mar. 2, 2016, 7 Pages.

Oculus, "Next-Generation Virtual Reality" retrieved from internet URL: https://www3.oculus.com/en-us/rift/, on Jul. 22, 2016, pp. 1-11.

Ossic, "The Technology", retrieved from the Internet URL: https://www.ossic.com/technology/ on Jul. 22, 2016, pp. 1-5.

Raghuvanshi N., et al., "Precomputed Wave Simulation for Real-Time Sound Propagation of Dynamic Sources in Complex Scenes", ACM Transactions on Graphics (SIGGRAPH 2010), vol. 29 (3), Jul. 2010, 18 Pages.

Samsung, "Gear VR", Virtual Reality Just Got Real, retrieved from the Internet URL: http://www.samsung.com/us/explore/gear-vr/, on Jul. 22, 2016, pp. 1-14.

Simonite T., "Microsoft's "3-D Audio" Gives Virtual Objects a Voice",Computing, MIT Technology Review, Jun. 4, 2014, Retrieved from Internet: https://www.technologyreview.com/s/527826/microsofts-3-d-audio-gives-virtual-objects-a-voice on Mar. 4, 2016, 9 Pages.

\* cited by examiner

MULTIMEDIA DEVICE FOR PROCESSING SPATIALIZED AUDIO BASED ON MOVEMENT

I. CROSS REFERENCE TO RELATED APPLICATIONS

The present application claims priority from and is a continuation application of pending U.S. patent application Ser. No. 15/233,767, filed Aug. 10, 2016, and entitled "MULTIMEDIA DEVICE FOR PROCESSING SPATIALIZED AUDIO BASED ON MOVEMENT," the contents of which are expressly incorporated herein by reference in their entirety.

II. FIELD

The present disclosure is generally related to a multimedia device for processing spatialized audio based on movement.

III. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Spatialized audio rendering systems output sounds that may enable user perception of a three-dimensional (3D) audio space. For example, a user may be wearing headphones, an augmented reality (AR) head mounted display (HMD), or a virtual reality (VR) HMD, and movement (e.g., translational or rotational movement) of at least a portion of the user may cause a perceived direction or distance of a sound to change. For example, a user may navigate from a first position in a visual (e.g., virtualized) environment to a second position in the visual environment. At the first position, a stream is in front of the user in the visual environment, and at the second position, the stream is to the right of the user in the visual environment. As the user navigates from the first position to the second position, the sound output by the spatialized audio rendering system may change such that the user perceives sounds of the stream as coming from the user's right instead of coming from in front of the user.

Sufficient processing resources to process a spatialized audio signal may not be available in at least some electronic devices (e.g., mobile phones), thereby limiting spatialized audio processing functionality of such devices. Additionally, the spatial resolution of some spatialized audio signals may not enable clear perception of a 3D audio space (e.g., sounds may not be perceptible as being located in a 3D area around the user). Additionally, processing resources available in some devices may not be sufficient to process a spatialized audio signal in real time to account for changes due to movement of a user (either in a physical environment or in a virtual environment).

IV. SUMMARY

In a particular aspect, a multimedia device includes one or more sensors configured to generate first sensor data and second sensor data. The first sensor data is indicative of a first position at a first time, and the second sensor data is indicative of a second position at a second time. The multimedia device further includes a processor coupled to the one or more sensors. The processor is configured to generate a first version of a spatialized audio signal, determine a cumulative value based on an offset, the first position, and the second position, and generate a second version of the spatialized audio signal based on the cumulative value.

In another particular aspect, a method includes initiating display of a visual environment associated with a spatialized audio signal. The method includes navigating from a first position within the visual environment to a second position within the visual environment at a first speed based on first sensor data. The method further includes generating two or more audio frames of a first version of the spatialized audio signal based on a translation distance from a first location of a sound field to a second location of the sound field. The first version of the spatialized audio signal indicates a change in a direction or a distance of the sound field based on navigating to the second location.

In another particular aspect, an apparatus includes means for displaying a visual environment associated with a spatialized audio signal. The apparatus includes means for navigating from a first position within the visual environment to a second position within the visual environment at a first speed based on first sensor data. The apparatus further includes means for generating two or more audio frames of a first version of the spatialized audio signal based on a translation distance from a first location of a sound field to a second location of the sound field. The first version of the spatialized audio signal indicates a change in a direction or a distance of the sound based on navigating to the second location.

In another particular aspect, a non-transitory computer readable medium stores instructions that, when executed by a processor, cause the processor to initiate display of a visual environment associated with a spatialized audio signal. The instructions may cause the processor to navigate from a first position within the visual environment to a second position within the visual environment at a first speed based on first sensor data. The instructions may further cause the processor to generate two or more audio frames of a first version of the spatialized audio signal based on a translation distance from a first location of a sound field to a second location of the sound field. The first version of the spatialized audio signal indicates a change in a direction or a distance of the sound field based on navigating to the second location.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
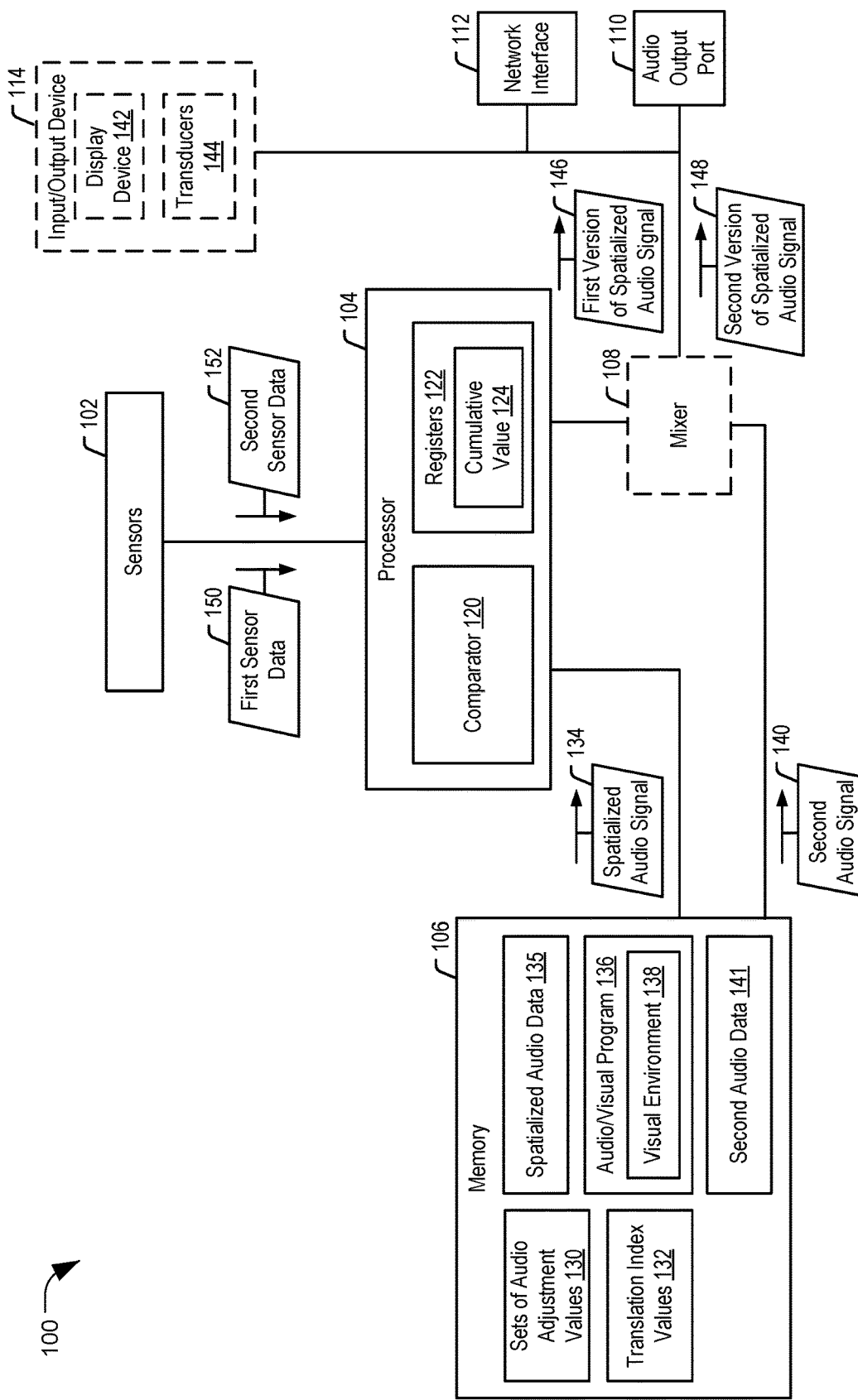
FIG. 1 illustrates a block diagram of an illustrative example of a multimedia device for processing spatialized audio signals.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Systems, devices, and methods for processing spatialized audio signals based on movement are disclosed. The systems, devices, and methods described herein may enable processing of spatialized audio signals using fewer processing resources than other techniques. The disclosed techniques enable processing of spatialized audio signals using devices that would otherwise lack sufficient processing resources to process spatialized audio signals. Thus, multimedia applications, such as virtual reality (VR) applications and augmented reality (AR) applications, may be enabled on a wider variety of devices, such as mobile devices and vehicles (e.g., smart cars, autonomous vehicles, etc.).

A multimedia device may be configured to generate frames of spatialized audio based on an input spatialized audio signal and sensor data. To illustrate, the multimedia device may be an audio/visual device that includes a display device (e.g., an eyepiece, a visual projector, a display screen, etc.) that is configured to display a visual environment and at least two transducers (e.g., a pair of headphones, two or more speakers, a speaker bar, etc.) that are configured to output audio based on the generated frames of spatialized audio (e.g., a processed spatialized audio signal). As a particular example, the multimedia device may be a head-mounted display (HMD) of a virtual reality (VR) system. As another particular example, the multimedia device may be a component of a vehicle, and the multimedia device may be configured to project an image on a windshield and to output audio from speakers integrated within the vehicle.

The multimedia device may be configured to process a spatialized audio signal based on sensor data. The multimedia device may include one or more sensors that are configured to generate sensor data indicative of a position of the multimedia device (or a user) within a physical environment or indicative of a position of a user within a visual environment generated by the multimedia device, such as a virtualized environment. As a particular example, the multimedia device may include (or may be coupled to) one or more motion sensors that generate sensor data based on a position of the multimedia device (or the user), and a user may navigate the visual environment (e.g., the virtualized environment) by moving (e.g., moving forward or backward, rotating, etc.). As another particular example, the one or more sensors may be included in a user interface device, such as a game controller, a touchpad, a keyboard, a mouse, or another user input device, and the sensor data generated by the one or more sensors may indicate user inputs that correspond to the user navigating the visual environment.

The multimedia device may process a spatialized audio signal (e.g., an input spatialized audio signal) based on the sensor data to generate a first version of the spatialized audio signal. For example, based on a first position indicated by first sensor data, the multimedia device may perform one or more operations on the spatialized audio signal to generate a first version of the spatialized audio signal. To illustrate, the multimedia device may receive (or access) a spatialized audio signal (e.g., an input spatialized audio signal) associated with the visual environment. For example, the spatialized audio signal may correspond to an audio track of a move, a video game, or an audio signal that is generated by the multimedia device. The multimedia device may generate the first version of the spatialized audio signal by modifying the spatialized audio signal to account for the first position. For example, if the first position is to the left of an origin, the spatialized audio signal may be modified such that one or more sounds associated with the spatialized audio signal are perceived as coming from a particular direction or distance based on the first position within the visual environment.

An audio output based on the first spatialized audio signal may enable a user to perceive a direction, a distance, or both, of a sound source relative to the user. For example, a user may be navigating a visual forest environment. The user may move to a first position, where a bird is located behind the user in the visual environment. The first position may be indicated by the sensor data. For example, the sensor data may include data from one or more motion sensors that track a position and orientation of a user (or of the multimedia device), or the sensor data may include data from a user input device, such as a control pad, that a user uses to navigate in the visual environment. The spatialized audio signal may be modified to generate the first version of the spatialized audio signal, and an audio output based on the first version of the spatialized audio signal may include a sound of a bird chirp that is perceived by the user as coming from behind the user.

To reduce processing resources used to generate different versions of the spatialized audio signal (e.g., to modify frames of the spatialized audio signal based on the sensor data), the multimedia device may include a memory that is configured to store sets of audio adjustment values. The sets of audio adjustment values may include coefficient matrices (e.g., rotation coefficient matrices and translation coefficient matrices), and at least some of the sets of audio adjustment values may be indexed by a corresponding translation index value. Other sets of audio adjustment values that correspond to rotation matrices may be indexed by a corresponding rotation index value. For example, a first set of audio adjustment coefficients may have a first translation index value of two centimeters, and the first set of audio adjustment values may include one or more values that are used to modify a spatialized audio signal to account for a translation of two centimeters in a particular direction (e.g., along a z-axis, as a non-limiting example). The sets of audio adjustment values may be used to modify a spatialized audio signal to account for a change in translation equal to the corresponding translation index value. As an example, a first set of audio adjustment values may correspond to a translation index value of two centimeters, and when sensor data indicates that a movement of two centimeters has occurred, the multimedia device may retrieve and use the first set of audio adjustment values to generate a first version of the spatialized audio signal. One or more operations, such as matrix multiplication operations, may be performed on the spatialized audio using the retrieved set of audio adjustment values to generate the first version of the spatialized audio signal, and the one or more operations may cause a translation (corresponding to the translation indicated by the sensor data) of sound sources (e.g., the bird) within a three-dimensional (3D) audio space associated with the spatialized audio signal. An audio output based on the first version of the spatialized audio signal enables user perception of a change in the distance to a sound (such as the bird chirp) that corresponds to the user's movement in the visual (e.g., virtualized) environment.

The number and granularity of the sets of audio adjustment values may be selected based on design considerations, such as available storage space and available processor resources. In some instances, a movement indicated by the sensor data may match a translation index value in the memory, and the first version of the spatialized audio signal is generated as described above. In other instances, the movement indicated by the sensor data does not match a translation index value in the memory (e.g., due to a limited number of sets of audio adjustment values being stored). As a particular, non-limiting example, sets of audio adjustment values corresponding to translation index values of one centimeter (e.g., a first translation index value), two centimeters (e.g., a second translation index value), four centimeters, eight centimeters, sixteen centimeters, and thirty-two centimeters may be stored. A difference (e.g., a first translational difference) between a first position and a second position (e.g., positions indicated by sensor data) may not match a translation index value. For example, the difference may be ten centimeters.

If the difference does not match the translation index values, a set of audio adjustment values corresponding to the largest translation index value (e.g., eight centimeters) that does not exceed the difference is selected, and the multimedia device generates a first version of the spatialized audio signal based on the selected set of audio adjustment values. An offset value (e.g., a difference between the first translational difference and the selected translation index value) may be applied over later frames to further modify the first version of the spatialized audio signal. For example, a cumulative value may be increased by two centimeters (e.g., the difference between the first translational difference and the selected translation index value). By quantizing the movement (e.g., the change in position indicated by the sensor data) and modifying multiple audio frames of the spatialized audio signal instead of a single audio frame, the first version of the spatialized audio signal may be generated without using as many processing resources as techniques that generate the sets of audio adjustment values in real-time. Additionally, because each audio frame is adjusted by an amount (e.g., the selected translation index value) that is relatively close to the change in position indicated by the sensor data, an audio output based on the spatialized audio signal is smooth and any lag is small enough to be imperceptible to a user. Thus, the multimedia device is configured to provide spatialized audio processing using fewer resources than other systems and without degrading a user experience.

To further reduce processing resources, translation operation and calculations (e.g., calculations performed to modify a spatialized audio signal based on sensor data indicating movement) may be simplified. As opposed to calculating the translation in a 3D space along three coordinate axes (e.g., x, y, and z coordinate axes) of a 3D sound field, one or more operations may be performed to rotate the 3D sound field such that the translation occurs along a single axis (e.g., a z-axis). To illustrate, one or more operations may be performed on the spatialized audio signal using coefficient values to rotate the 3D sound field to align the z-axis with the movement. The spatialized audio signal may be modified (e.g., one or more operations, such as matrix multiplication operations, may be performed on the spatialized audio signal using one or more coefficient values) to account for the movement along a single axis, and the 3D sound field may be rotated again to realign the sound field with the user (e.g., to reverse the first rotation and, additionally, to account for any change in orientation of the user). Because the operations performed to account for translation along a single axis (e.g., the z-axis) are less complex than operations that account for translation along three axes, the above-described operations use less processing resources than other multimedia devices that modify spatialized audio signals based on translations along multiple axes. Although the translation operation has been described with respect to the z-axis, in other implementations, the translation may occur along an x-axis, a y-axis, or another axis.

Because a particular number of sets of audio adjustment values are pre-computed and stored in the memory, real-time generation of the audio adjustment values is avoided, which may enable spatialized audio processing at systems having fewer processing resources. Additionally, quantizing the movement (e.g., spreading movement corresponding to one audio frame among multiple audio frames) may enable the multimedia device to provide spatialized audio processing using fewer resources and without degrading a user experience. Further, simplifying the calculation of translations to a single axis may further reduce processing resources used by the multimedia device.

FIG. 1 illustrates a multimedia device 100 for processing spatialized audio signals. The multimedia device 100 may adjust or modify spatialized audio signals to rotate and reposition a sound field (or audio objects/sounds sources thereof) associated with a virtualized environment. The multimedia device 100 may include or correspond to a portable personal computing device, such as a mobile phone or a tablet, as illustrative, non-limiting examples. The multimedia device 100 may include one or more sensors 102, a processor 104, and a memory 106.

Spatialized audio refers to the capture and reproduction of audio signals in a manner that preserves or simulates location information of audio sources in an audio scene (e.g., a 3D audio space). To illustrate, upon listening to playback of a spatial audio signal, a listener is able to perceive a relative location of various audio sources in the audio scene relative to each other and relative to the listener. One format for creating and playing back spatial audio signals is channel based surround sound format. In a channel based surround sound system, loudspeaker feeds are adjusted to create a reproduction of the audio scene. Another format for spatial audio signals is object-based audio. In object-based audio, audio objects are used to create spatial audio signals. Each audio object is associated with 3D coordinates (and other metadata), and the audio objects are simulated at the playback side to create perception by a listener that a sound is originating from a particular location of an audio object. An audio scene may consist of several audio objects. Object-based audio is used in multiple systems, including video game systems. Higher order ambisonics (HOA) is another format for spatialized audio signals. HOA is used to capture, transmit and render spatial audio signals. HOA represents an entire sound field in a compact and accurate manner and aims to recreate the actual sound field of the capture location at the playback location (e.g., at an audio output device). HOA signals enable a listener to experience the same audio spatialization as the listener would experience at the actual scene. In each of the above formats (e.g., channel based audio, object-based audio, and HOA based audio), multiple transducers (e.g., loud speakers) are used for audio playback. If the audio playback output by headphones, additional processing (e.g., binauralization) is performed to generate audio signals that "trick" the listener's brain into thinking that the sound is actually coming from different points in the space rather than from the transducers in the headphones.

The one or more sensors 102 may be coupled to the processor 104. As used herein, "coupled" may include "communicatively coupled," "electrically coupled," or "physically coupled," and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The one or more sensors 102 may be configured to generate sensor data and to send the sensor data to the processor 104. For example, the one or more sensors 102 may be configured to generate first sensor data 150 and second sensor data 152. The first sensor data 150 may be indicative of a first position of a user at a first time, and the second sensor data 152 may be indicative of a second position of the user at a second time. The position of the user may correspond or represent a position of the user in a visual environment 138 (e.g., a virtualized environment). The one or more sensors may include motion or movement sensors, such as an infrared sensor, an accelerometer, a gyro sensor, an orientation sensor, a linear position sensor, a proximity sensor, a motion sensor, an angular position sensor, a global positioning system (GPS) sensor, an ultrasound sensor, a camera, or a combination thereof. Additionally or alternatively, the one or more sensors may include sensors of a user input device, such as a controller, a joystick, a touch screen, a keyboard, a mouse, a voice input system, or another user input device.

In some implementations, the sensor data may be generated based on user input. For example, the first sensor data 150 may be based on a first user input, and the second sensor data 152 may be based on a second user input. The sensor data may be generated based on capturing or receiving the user input. For example, an infrared sensor, an imaging device, or both, may capture (physical) movement of the user, gestures of the user, or both, and may generate sensor data based on the movement, gestures, or both. As another example, a gyroscope, a controller (e.g., a game pad), or both, may generate sensor data based on a received user input (e.g., depressing a button, moving a joystick, performing a touch gesture, etc.), or both.

The sensor data may include data corresponding to a location, a translation, an orientation, a height, a speed, a velocity, an acceleration, an angular speed, or a combination thereof, of the user in a visual environment 138 (e.g., a virtualized environment). The visual environment 138 may be associated with an audio/visual program 136, such as a virtual reality game, a movie, and interactive application, a video conferencing application, a vehicle control application, or another application or program. In a particular implementation, the first sensor data 150 includes first translation data, first orientation data, or both. The second sensor data 152 may include second translation data, second orientation data, or both.

The processor 104 may be configured to generate output spatialized audio signals that account for movement of a user in an audio/visual environment (e.g., a virtualized environment). The output spatialized audio signals may be generated by modifying input spatialized audio signals. For example, the processor 104 may generate a first version of a spatialized audio signal 146 based on a spatialized audio signal 134. The first version of the spatialized audio signal 146 may indicate a change in a direction or a distance of a sound field associated with the spatialized audio signal 134 based on navigating to the first location within the visual environment, as further described herein.

The processor 104 may include a comparator 120 and one or more registers 122. The comparator 120 may be configured to compare two values and to output a difference between the two values. For example, the comparator 120 may be configured to compare a first position value to a second position value to determine a difference between the position values. As another example, the comparator 120 may compare a translation value (e.g., a translational difference value) indicated by a difference in position (e.g., a difference from the first position of the user to the second position of the user) to translation index values 132 stored at the memory 106. The differences between translational difference values and translation index values 132 may be used by the processor 104 to identify a largest translation index value that does not exceed the translational difference value. The processor 104 may be configured to calculate an offset value (e.g., a remainder) based on a difference between the translational difference value and the identified translation index value. In some implementations, the processor 104 may select the largest value of the table or index that is less than or equal to the translational difference value.

The processor 104 may be configured to determine a cumulative value 124 based on the offset value (e.g., the remainder) and the translational difference value (e.g., a difference between the first position and the second position of the user indicted by the first sensor data 150 and the second sensor data 152).

The processor 104 may be configured to generate a second version of the spatialized audio signal 148 based on the cumulative value 124. To illustrate, the processor 104 may identify a particular translation index value based on the cumulative value 124. As an example, the processor may identify a largest translation index value of the translation index values 132 that does not exceed the cumulative value 124. The processor 104 may retrieve a set of audio adjustment values that corresponds to the particular translation index value from sets of audio adjustment values 130 stored at the memory 106, as further described herein. The processor 104 may modify the first version of the spatialized audio signal 146 based on the retrieved set of audio adjustment values to generate the second version of the spatialized audio signal 148. The second version of the spatialized audio signal 148 may account for a change to a sound (e.g., an audio object of the sound field) based on the change in position (e.g., from the first position to the second position). The second version of the spatialized audio signal 148 may enable user perception of a change in a direction or a distance of the sound field relative to the user based on navigating from first position to the second location.

The one or more registers 122 of the processor 104 may be configured to store data, such as offset data, cumulative values (e.g., the cumulative value 124), translation values, audio adjustment values, sensor data, or other data.

The memory 106 may be coupled to the processor 104 and may be configured to store data. For example, the memory 106 may store the sets of audio adjustment values 130 and the translation index values 132. The memory 106 may also store spatialized audio data 135 corresponding to the spatialized audio signal 134. The sets of audio adjustment values 130 may include rotation operators and translation operators. The rotation operators may include or correspond to a plurality of rotation matrices, and the translation operators may include or correspond to a plurality of translation matrices. Each of the rotation matrices may include a plurality of rotation coefficients and each of the translation matrices may include a plurality of translation coefficients. In a particular implementation, the coefficients include higher order ambisonic (HOA) coefficients. A size of a rotation matrix, a translation matrix, or both, may correspond to an ambisonic order (e.g., a number of signal or directional components of the ambisonic order) of the spatialized audio signal 134. For example, for a 4th order ambisonic signal may include 25 signal or directional components, and the rotation matrix, the translation matrix, or both, may include 25 coefficients (e.g., the translation matrix or the rotation matrix may be a 5×5 matrix of coefficients).

At least some of the sets of audio adjustment values 130 may be indexed by the translation index values 132. For example, a set of audio adjustment values that corresponds to a translation of 2 centimeters may have a translation index value of 2 centimeters. As another example, a set of audio adjustment values that corresponds to a translation of 4 centimeters may have a translation index value of 4 centimeters. The translation index values 132 may include values that correspond to various speeds of the user in the visual environment 138 of the audio/visual program 136. For example, the translation index values 132 may include a first translation index value that corresponds to a walking speed, a second translation index value that corresponds to a jogging speed, a third translation index value that corresponds to a running speed, a fourth translation index value that corresponds to a biking speed, a fifth translation index value that corresponds to a vehicle speed, and a sixth translation index value that corresponds to an aircraft speed. Additionally, the translation index values 132 may include a "catch-up" value. For example, a largest translation index value of the translation index values 132 may be many times greater than a next largest translation index value. As an illustrative, non-limiting example, the translation index values 132 may include values of [1, 2, 4, 8, 16, 64], with 64 corresponding to the catch-up value. The catch-up value may enable the processor 104 to catch-up to accumulated offset values. The catch-up value may not be perceptible by the user.

The sets of audio adjustment values 130 may be indexed by the translation index values 132. For example, each translation index value of the translation index values 132 may have a corresponding set of audio adjustment values. To illustrate, the processor 104 may retrieve or receive a set of audio adjustment values that correspond to a particular translation index value based on identifying or selecting the particular translation index value.

The sets of audio adjustment values 130 and the translation index values 132 may be associated with modifying the spatialized audio signal 134, as further described herein. The sets of audio adjustment values 130 may be used to modify a spatialized audio signal to account for a change in translation (e.g., a change in position of the user in the visual environment 138) equal to the corresponding translational difference value.

The memory 106 may store a spatialized audio signal 134 and an audio/visual program 136. In some implementations, the spatialized audio signal 134 is formatted in accordance with a high order ambisonic (HOA) format. For example, the spatialized audio signal 134 may include data corresponding to directional information of a 3D sound field. As illustrative, non-limiting examples, the spatialized audio signal 134 may be (e.g., have a format of) a second order HOA signal, a third order HOA signal, a fourth order HOA signal, a fifth order HOA signal, etc. In other implementations, the spatialized audio signal 134 is formatted in accordance with an audio channel format or an audio object-based format. For example, the spatialized audio signal 134 may include data corresponding to one or more channels or may include data corresponding to one or more objects. The spatialized audio signal 134 and the audio/visual program 136 may be associated with one another. For example, the spatialized audio signal 134 may represent multiple sound sources of a sound field corresponding to the visual environment 138. To illustrate, the spatialized audio signal 134 may represent sounds of a dog barking, an ambulance siren, and a car engine when the visual environment 138 is an urban environment. Additionally or alternatively, the visual environment 138 may represent indoor environments (e.g., an interior region), other outdoor environments (e.g., an outdoor region), or both. The visual environment 138 may include or correspond to a virtual reality environment, an augmented reality environment, or another visually perceivable environment.

In some implementations, the multimedia device 100 may include a mixer 108. The mixer 108 may be coupled to the processor 104 and configured to mix output spatialized audio signals (e.g., the first version of the spatialized audio signal 146 or the second version of the spatialized audio signal 148) with other audio signals. For example, the mixer 108 may mix the output spatialized audio signals with mono or stereo audio signals. In such implementations, the memory 106 may store second audio data 141 corresponding to a second audio signal 140, and the second audio signal 140 may include a mono audio signal or a stereo audio signal, or both.

The multimedia device 100 may include an audio output port 110, a network interface 112. The audio output port 110 may be coupled to the processor 104 and to an external audio output device. The audio output port 110 may be configured to transmit or provide the output spatialized audio signals to the external audio output device. For example, the processor 104 may transmit the first version of the spatialized audio signal 146, the second version of the spatialized audio signal 148, or both, to the external audio output device via the audio output port 110. As illustrative, non-limiting examples, the audio output port 110 may include or correspond to a 3.5 millimeter (mm) stereo port (e.g., an audio jack), a universal serial bus (USB) port, another port, or a combination thereof. The external audio output device may include or correspond to one or more speakers, a speaker bar, a surround sound system, headphones, or a combination thereof.

The network interface 112 may be coupled to the processor 104. The network interface 112 may be configured to send and receive data. For example, the network interface 112 may receive the sets of audio adjustment values 130, the translation index values 132, the spatialized audio signal 134, the audio/visual program 136, the second audio signal 140, the sensor data 150, 152, or a combination thereof. The network interface 112 may send output spatialized audio signals and video data indicative of the visual environment 138 to external output devices. The network interface 112 may include or correspond to a wired interface, a wireless interface, or both.

In some implementations, the multimedia device 100 may include an input/output (I/O) device 114 coupled to the processor 104. The I/O device 114 may include a display device 142, one or more transducers 144, or a combination thereof. The display device 142 may be coupled to the processor 104 and may be configured to display visual content associated with a multimedia program. For example, the display device 142 may display the visual environment 138 of the audio/visual program 136.

To illustrate, in some implementations, the display device 142 may be a head mounted display (HMD), as described with reference to FIG. 4. In other implementations, the display device 142 may be a projection device configured to project a three-dimensional (3D) image of the visual environment 138, as described with reference to FIG. 5. In some implementations, the display device 142 may be included in a component of a vehicle, as described with reference to FIG. 6. For example, the display device 142 be integrated in a windshield of an automobile and may display the visual environment 138 or may project the visual environment 138 on the windshield.

The one or more transducers 144 may be coupled to the processor 104 and may be configured to receive audio signals, output audio signals, or both. For example, the one or more transducers 144 may output the first version of the spatialized audio signal 146, the second version of the spatialized audio signal 148, the second audio signal 140, or a combination thereof. To illustrate, the one or more transducers 144 may be configured to generate a first audio output based on the first version of the spatialized audio signal 146, the second audio signal 140, or both. The one or more transducers 144 may be configured to generate a second audio output based on the second version of the spatialized audio signal 148, the second audio signal 140, or both.

The one or more transducers 144 may include one or speakers, microphones, or a combination thereof. As illustrative, non-limiting examples, the speakers may include or correspond to a pair of headphones, a speaker bar, a surround sound system, or a combination thereof, and the microphones may include or correspond to a linear microphone array, a 3D microphone, an Eigen microphone, or a combination thereof. In a particular implementation, the one or more transducers 144 include one or more microphones configured to capture spatialized audio signals. Audio data corresponding to the captured spatialized audio signals may be stored in the memory 106. The captured spatialized audio signal may be modified by the processor 104 and output via the audio output port 110, the I/O device 114, or both.

During operation, a user may input a command to the multimedia device 100 to begin the audio/visual program 136, and the processor 104 may execute and the audio/visual program 136. For example, the processor 104 may initiate displaying the visual environment 138 and may initiate playback of the spatialized audio signal 134. The visual environment 138 may be displayed via the display device 142 or via an external display device coupled to the multimedia device 100. Audio signals may be output via the one or more transducers 144 or via an external audio device coupled to the multimedia device 100. The multimedia device 100 may process the spatialized audio signal 134 based on user movement received from the one or more sensors 102 to output modified versions of the spatialized audio signal 134 (e.g., the first version of the spatialized audio signal 146 and the second version of the spatialized audio signal 148). In a particular implementation, the spatialized audio signal 134 may include or correspond to a fourth order HOA signal.

To illustrate, the user may change positions in a physical environment and may rotate a head of the user, and the one or more sensors 102 may receive the user movement as inputs and generate sensor data. For example, the one or more sensors may receive a first user input and generate the first sensor data 150. The first sensor data 150 may be representative of a first position of the user in the visual environment 138 and may include orientation data and translation data. The processor 104 may generate the first version of the spatialized audio signal 146 based on the first sensor data 150. Detailed explanation of the generation of versions of the spatialized audio signals is described with reference to the second version of the spatialized audio signal 148. The processor 104 may output first audio output based on the first version of the spatialized audio signal 146 via the one or more transducers 144, the external audio device, or both. In some implementations, the external audio device may be coupled to the multimedia device 100 via the audio output port 110. In other implementations, the external audio device may be coupled to the multimedia device via the network interface 112.

The one or more sensors 102 may receive a second input and generate the second sensor data 152. The second sensor data 152 may be representative of a second position of the user in the visual environment 138. The processor 104 may calculate a translation value (e.g., an amount of user movement in the visual environment 138 from the first position to the second position) based on a difference between the first position and the second position. The first position may be indicated by the first sensor data 150 and the second position may be indicated by the second sensor data 152. The processor 104 may identify and select a translation index value based on the translation value (e.g., a translational difference value). For example, the comparator 120 may compare the translation value to the translation index values 132 to determine if the translation value matches a particular translation index value of the translation index values 132. If the translation value matches a particular translation index value, then the processor 104 may select the particular translation index value. If the translation value does not match the particular translation index value, the processor 104 (or the comparator 120) may identify and select a largest translation index value that is less than the translation value, as described further with reference to FIG. 2.

Additionally or alternatively, the processor 104 may identify and select the translation index value based on the cumulative value 124. The cumulative value 124 may be based on an offset value, the first position, and the second position. For example, the processor 104 may identify and select a translation index value based on a sum of the offset value and the translation value (e.g., the translational difference value based on the difference between the first position and the second position), as described above and with reference to FIG. 2.

The processor 104 may retrieve a particular set of audio adjustment values of the audio adjustment values 130 based on the selected largest translation index value. The sets of audio adjustment values 130 may be indexed by the translation index values 132, and each translation index value may have a corresponding set of audio adjustment values. To illustrate, the set of audio adjustment values 130 may include a plurality of rotation matrices (e.g., matrices including pitch, yaw, and roll angles) and a plurality of translation matrices (e.g., matrices including x, y, and z coordinates). The plurality of translation matrices may be indexed by translation index values. The plurality of rotation matrices may be indexed by rotation index values. The processor 104 may retrieve a particular translation matrix based on the selected largest translation index value.

Additionally, the processor 104 may determine and retrieve a particular rotation matrix of the plurality of rotation matrices based on the translation data (e.g., a direction of the translation), the orientation data of the first sensor data 150 and the second sensor data 152. The plurality of rotation matrices may be indexed by an amount of rotation (e.g., such as degrees of rotation). For example, the processor 104 may convert a coordinate system (e.g., Cartesian, x,y,z) of the sensor data to a coordinate system (e.g., spherical azimuth and elevation) of the spatialized audio signal 134, the first version of the spatialized audio signal 146, or both, to determine an amount of rotation associated with a rotation of the head of the user when navigating from the first position to the second position, an amount of rotation to align the translation of the user with an axis (e.g., the z-axis), a third amount of rotation to invert (or reverse) the second amount of rotation. The processor 104 may retrieve one or more rotation matrices based on the first amount of rotation, the second amount of rotation, the third amount of rotation, or a combination thereof. To illustrate, the processor 104 may retrieve a first rotation matrix based on the second amount of rotation and may retrieve a second rotation matrix based on the first amount of rotation, the third amount of rotation, or both. In other implementations, the processor 104 may not convert the coordinate systems.

The processor 104 may modify the first version of the spatialized audio signal 146 based on the particular set of audio adjustment values to generate the second version of the spatialized audio signal 148. To illustrate, the processor 104 may modify the first version of the spatialized audio signal 146 by applying one or more adjustment matrices (e.g., one or more rotation matrices, one or more translation matrices, or both) to the first version of the spatialized audio signal 146. For example, the first version of the spatialized audio signal 146 may be represented by a matrix. Values of the matrix may correspond to magnitudes of directional components of the first version of the spatialized audio signal 146. The adjustment matrix may include a matrix of coefficients configured to rotate and translate the sound field represented by the first version of the spatialized audio signal 146 based on the user movement. For example, the adjustment matrix may rotate the sound field to account for head rotation of the user and may translate the sound field to account for translation of the user from the first position to the second position in the visual environment 138. In other implementations, the adjustment matrix may include multiple matrices, such as the first matrix configured to rotate (e.g., the first rotation matrix) the sound field to enable one-dimensional translation, a second matrix configured to translate (e.g., the translation matrix) the sound field to account for the user movement, and a third matrix configured to rotate (e.g., the second rotation matrix) the sound field to account for head rotation of the user and to reverse the rotation made to enable one-dimensional translation.

To illustrate, the adjustment (e.g., the translation) from the first position to the second position may be computed by the following equations. The equations relate spherical harmonics, which are functions that are defined on a surface of a sphere. Equations 1 through 7 are associated with a three-dimensional translation operation to translate from the first position to the second position. Equations 8-13 are associated with a modified (e.g., simplified) one-dimensional translation operation to translate from the first position to the second position.

$$p(r=r_a, \theta, \phi, k) = \sum_{n=0}^{N} \sum_{m=-n}^{n} c_{nm}(k) j_n(kr) Y_n^m(\theta, \phi) \quad \text{Equation 1}$$

In Equation 1, p(r) represents the sound field on a spherical surface of radius $r_a$ defined around an origin (O). The origin may correspond to the first position. The sound field may include or be represented by a plurality of spatialized audio coefficients. Theta (θ) is a polar angle and phi (φ) is an azimuthal angle, consistent with a standard spherical coordinate system. The azimuth angle may be zero when facing straight ahead and the azimuthal angle increases in a counter-clockwise direction. The elevation angle may be zero on a horizontal plane and positive in an upper hemisphere.

In Equation 1, an HOA signal in a frequency domain is represented by $c_{nm}(k)$, where (k) is a wavenumber. The wavenumber (k) is a spatial frequency associated with the sound field (e.g., a number of waves per a unit of distance). The wavenumber may be defined as k=2πf/c, where f denotes a frequency and c is the speed of sound.

In Equation 1, n is an order of the sound field (e.g., an HOA order) and m is a suborder of the sound field at the frequency f. Additionally, $j_n(kr)$ corresponds to a spherical Bessel function and $Y_n^m(\theta, \phi)$ corresponds to a spherical harmonics function for a given order and suborder. Equation 1 represents that the sound field p(r) may be equal to (e.g., represented by) an HOA signal.

$$p'(r'=r_a, \theta', \phi', k) = \sum_{n'=0}^{N} \sum_{m'=-n'}^{n'} c'_{n'm'}(k) j_{n'}(kr') Y_{n'}^{m'}(\theta', \phi') \quad \text{Equation 2}$$

Equation 2 represents a translated sound field p'(r') at a translated position (e.g., the second position) where the sound field has a new origin O'. The translated sound field p'(r'=$r_a$, θ', φ', k) is defined on a spherical surface of radius r'=$r_a$ about the new origin O'. The translation to the new position of O' relative to original position O is given by spherical coordinates (r", θ", φ"). A modified HOA signal associated with the translated position is represented by $c'_{n'm'}(k)$. In order to obtain the translated sound field (e.g., the HOA coefficients of the sound field) at the translated position, $c'_{n'm'}$ is computed.

$$B_{n'm',nm}(k) = \Sigma_{|n-n'|<n''<n+n'} C_{n'm',nm}{}^{n''} j_{n''}(kr'') Y_{n''}{}^{m-m'}(\theta'', \phi'') \quad \text{Equation 3}$$

In Equation 3, a translation operator $B_{n'm',nm}(k)$ represents the scaling (or weighting) applied to the HOA signal $c_{nm}(k)$ of the order n and the suborder m and at the original position to obtain the modified HOA signal, $c'_{n'm'}(k)$ of an order n' and a suborder m' and at the translated position. The index n" may be used to sum the orders n that contribute to obtaining n'. In Equation 3, $C_{n'm',nm}{}^{n''}$ represents a component of the scaling (or weighting) which is independent of the translation distance or angle. The translation operator $B_{n'm',nm}(k)$ may be used to obtain the translated sound field. The translation operator may be computed by solving for $C_{n'm',nm}{}^{n''}$.

$$C_{n'm',nm}^{n''} = 4\pi i^{(n'+n''-n)}(-1)^m \sqrt{\frac{(2n+1)(2n'+1)(2n''+1)}{4\pi}} \begin{pmatrix} n & n' & n'' \\ 0 & 0 & 0 \end{pmatrix} \begin{pmatrix} n & n' & n'' \\ -m & m' & m-m' \end{pmatrix} \quad \text{Equation 4}$$

In equation 4, $$\begin{pmatrix} n & n' & n'' \\ m & m' & m'' \end{pmatrix}$$

corresponds to the Wigner 3-j symbol.

$$B = \begin{bmatrix} B_{00,00} & B_{1-1,00} & B_{10,00} & \cdots & B_{NN,00} \\ \vdots & \vdots & \vdots & \ddots & \vdots \\ B_{00,NN} & B_{1-1,NN} & B_{10,NN} & \cdots & B_{NN,NN} \end{bmatrix} \quad \text{Equation 5}$$

Equation 5 shows the translation matrix for the wavenumber k. The wavenumber k has been omitted to simplify Equation 5. The translation matrix includes a plurality of scaling factors (or scale values) $B_{x,y}$. Each of the scaling factors may correspond to (and may be multiplied by) a HOA coefficient of the HOA signal.

$$c = (c_{00}\ c_{1-1}\ \ldots\ c_{NN})^T \quad \text{Equation 6}$$

$$c' = (c'_{00}\ c'_{1-1}\ \ldots\ c'_{NN})^T \quad \text{Equation 7}$$

In Equations 6 and 7, c represents a vector of the HOA signal at the original position and c' represents a vector of the new HOA signal at the translated position. For clarity, the wavenumber k has been omitted from the equations 6 and 7.

$$c' = Bc \quad \text{Equation 8}$$

In Equation 8, multiplying the original HOA vector c by a translation matrix B results in the HOA vector c' at the new translated position. The one-dimensional translation along the positive z-axis utilizes several smaller matrix multiplications at different suborders m as compared to multiplication by a large matrix B of size $(N+1)^2 \times (N+1)^2$. The one-dimensional translation is performed independent of angular coordinates (e.g., θ"=0 and φ"=0) in computing $B_{n'm,nm}$.

$$c'_{n'm} = \Sigma_{n=|m|}^{N} B_{n'm,nm} c_{nm} \quad \text{Equation 9}$$

Equation 9 illustrates the relationship between the new HOA signal $c'_{n'm}$ and the original HOA signal $c_{nm}$. Equation 9 can be converted to a matrix equation similar to Equation 5, as shown in Equation 10.

$$c'_m = B_m c_m \quad \text{Equation 10}$$

$$c_m = (c_{|m|m}\ \ldots\ c_{Nm})^T \quad \text{Equation 11}$$

$$c'_m = (c'_{|m|m}\ \ldots\ c'_{Nm})^T \quad \text{Equation 12}$$

$$B_m = \begin{pmatrix} B_{|m|m,|m|m} & \cdots & B_{|m|m,Nm} \\ \vdots & \ddots & \vdots \\ B_{Nm,|m|m} & \cdots & B_{Nm,Nm} \end{pmatrix} \quad \text{Equation 13}$$

Equations 11-13 further describe elements of Equation 10. HOA signals in vector form are represents in Equations 11 and 12. Referring to Equation 13, the matrix $B_m$ may include a plurality of scaling factors (or scale values), and a size of the matrix $B_m$ depends on the HOA order (n). For example, for a fourth order HOA signal, the matrix $B_m$ may be a 5 by 5 matrix and may include 25 scale values for the 25 HOA coefficients of the fourth order HOA signal.

After the second version of the spatialized audio signal 148 is generated, the multimedia device 100 may output second audio output based on the second version of the spatialized audio signal 148 and may output modified video data indicating the user at the second position in the visual environment 138. The second audio output and the modified video data may be output via the audio output port 110, the network interface 112, the I/O device 114, or a combination thereof. The second version of the spatialized audio signal 148 may indicate a change in a direction or a distance of the sound field based on navigating to the second location.

In some implementations, the multimedia device 100 may mix mono or stereo signals with the spatialized audio output. In such implementations, the mixer 108 may be coupled to processor 104 and may mix the second audio signal 140 (or a portion thereof) with the second version of the spatialized audio signal 148 to generate a mixed audio signal. The multimedia device 100 may output the mixed audio signal via the audio output port 110, the one or more transducers 144, or both.

In some implementations, the multimedia device 100 may include a binauralizor and digital to analog converter to process the second version of the spatialized audio signal 148 to generate the second audio output, as described with reference to FIG. 7.

In some implementations, a video frame rate, an audio frame rate, and a sensor data rate of the multimedia device 100 may be different rates. As an illustrative, non-limiting example, an audio frame rate may be approximately 38 frames per second (fps), corresponding to an audio frame length of 26 ms, and a video frame rate may be 60 fps. A sensor data rate may be 100 ms (e.g., the one or more sensors 102 may sample data in 100 ms intervals). Thus, in some implementations, because fewer audio frames are processed per second than video frames, a single audio frame may correspond to multiple video frames.

In some implementations, the memory 106 may store rotation matrices of the audio adjustment values 130 for a portion of the sound field and the processor 104 may be configured to rotate the other portions of the sound field based on the rotation matrices for the portion of the sound field. To illustrate, the memory 106 may store rotation matrices for elevation angles of −90 degrees to 90 degrees (e.g., polar angles 0 degrees to 180 degrees) and for azimuth angles of 0 degrees to 360 degrees at a fixed angular resolution, such as every 0.5 degrees, 1 degree, 2 degrees, 4 degrees, 5 degrees, etc. In a particular implementation, the memory 106 may store rotation matrices for a single octant (e.g., $\frac{1}{8}^{th}$) of the sound field. For example, the memory 106 may store rotation matrices for elevation angles of 0 degrees to 90 degrees and for azimuth angles of 0 degrees to 360 degrees at a fixed angular resolution. In such implementations, the processor 104 may be configured to rotate the sound field for other portions (or octants) based on the stored rotation matrices for the single octant. By storing rotation matrices for a portion (e.g., one octant) of the sound field, less memory may be used or increased angular resolution may be achieved.

Additionally or alternatively, the memory 106 may store a different number of rotation matrices for a first type of rotation than for a second type of rotation. As an illustrative, non-limiting example, the memory 106 may store multiple angular values for first axis rotations and may store one angular value for second axis rotations. To illustrate, as rotating about the z-axis may be less complex than rotating about the y-axis, the memory may store multiple rotation matrices for z-axis rotations and one rotation matrix (e.g., corresponding to an angular value of 90 degrees) for y-axis rotations.

Because a particular number of sets of audio adjustment values are pre-computed and stored in the memory 106, real-time generation of the audio adjustment values 130 is avoided, which may enable spatialized audio processing at systems having fewer processing resources. Additionally, quantizing the movement (e.g., spreading movement corresponding to one audio frame among multiple audio frames) may enable the multimedia device to provide spatialized audio processing using fewer resources and without degrading a user experience. Further, simplifying the calculation of translations to a single axis may further reduce processing resources used by the multimedia device 100.

In the above description, various functions performed by the multimedia device 100 of FIG. 1 are described as being performed by certain components. However, this division of components is for illustration only. In an alternate implementation, a function described herein as performed by a particular component may instead be divided amongst multiple components. Moreover, in an alternate implementation, two or more components of FIG. 1 may be integrated into a single component. For example, the processor 104 and the mixer 108 may be integrated in a single component. Alternatively, the one or more sensors 102 and the processor 104 may be integrated in a single component. Each component illustrated in FIG. 1 may be implemented using hardware (e.g., a field-programmable gate array (FPGA) device, an application-specific integrated circuit (ASIC), a DSP, a controller, etc.) or a combination of hardware and software.

Figure 2:
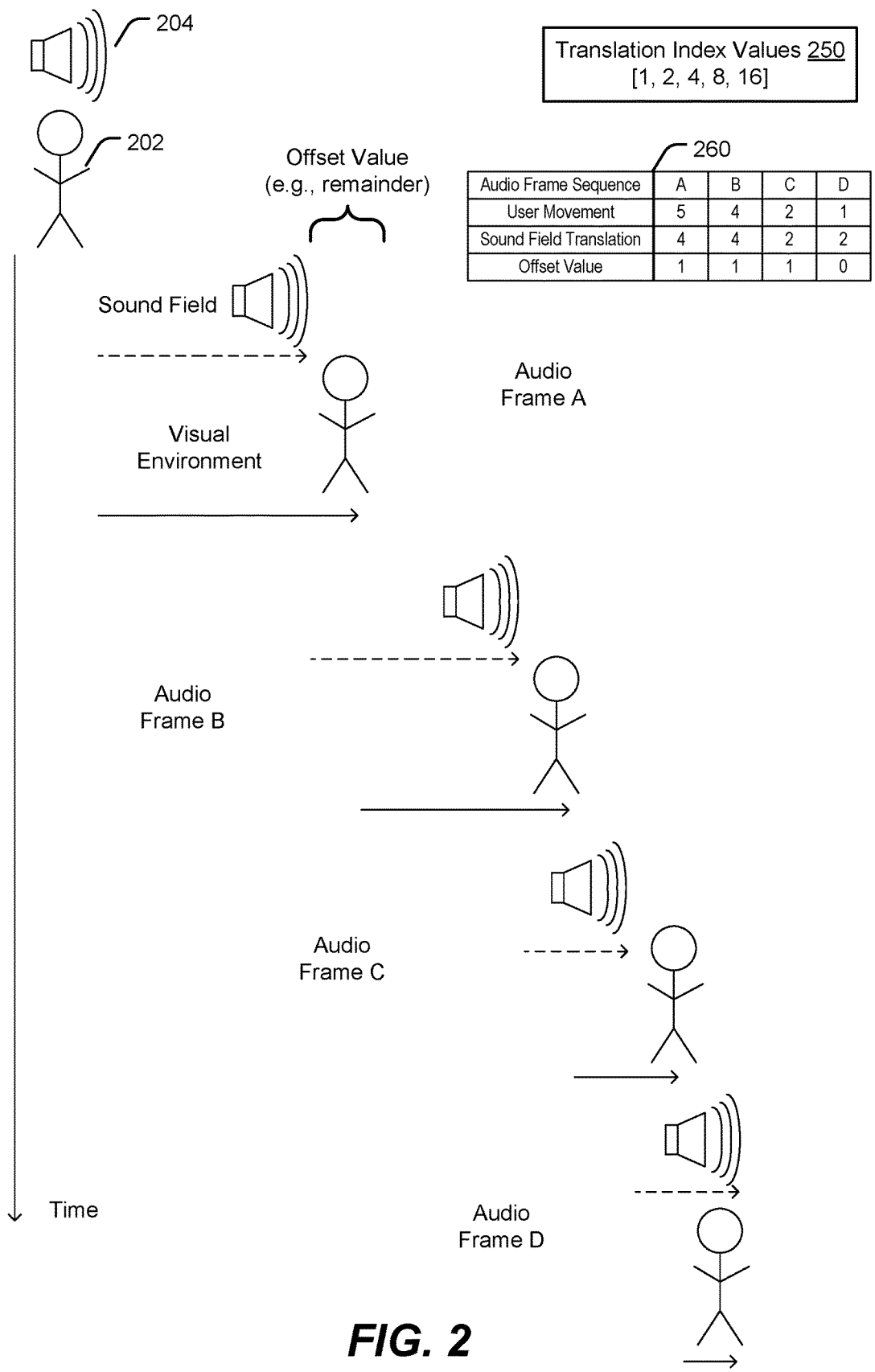
FIG. 2 illustrates positions of a sound field relative to a user within a visual environment.

FIG. 2 illustrates positions of an audio object 204 of a sound field relative to a user 202 within a visual environment during multiple audio frames. Processing the sound field and the visual environment may be performed by the multimedia device 100 of FIG. 1. The sound field and the visual environment may be associated with an audio visual program of the multimedia device 100, such as audio/visual program 136 of FIG. 1. The audio object 204 of the sound field may include or correspond to at least a portion of the spatialized audio signals of FIG. 1, such as the spatialized audio signal 134. The visual environment may include or correspond to the visual environment 138 of FIG. 1

FIG. 2 illustrates five positions of the user 202 and the audio object 204 as the user 202 navigates through the visual environment. As the user 202 navigates through the visual environment, a position of the audio object 204 is updated. FIG. 2 illustrates a diagram of the five positions that represent four movements by the user (e.g., user movement). Each user movement may have an audio frame associated with the user movement, such as Audio Frame A, Audio Frame B, Audio Frame C, and Audio Frame D. As explained with reference to FIG. 1, a video frames rate may be different than an audio frame rate. Accordingly, during the audio frames, one or more video frames may be processed by the multimedia device to navigate the user between the five positions.

FIG. 2 includes translation index values 250. The translation index values 250 may include or correspond to translation index values 132 of FIG. 1. As illustrated in FIG. 2, the translation index values 250 includes 1, 2, 4, 8, and 16. In other implementations, the translation index values 250 may include other values. Although five translation index values are illustrated in FIG. 2, in other implementations the translation index values 250 may include more than five translation index values or fewer than five translation index values. The translation index values 250 may be linear, exponential, or logarithmic values. For example, the translation index values 250 illustrated in FIG. 2 are exponential values. As explained with reference to FIG. 1, the translation index values 250 may correspond to speed values (e.g., walking, running, etc.) of the user in the visual environment, may include a catch-up value, or both.

A table 260 illustrates values for user movement, sound field translation, and offset values (e.g., remainders) corresponding to the audio frames. The user movement may be determined based on or may be indicated by sensor data. The sound field translation may be determined based on a largest translation index value of the translation index values 250 that does not exceed (e.g., is less than) the user movement. The offset value may be determined by a difference between the user movement and the sound field translation.

During a time period associated with Audio Frame A, the user 202 navigates from an original position (e.g., a previous position) to a first position in the visual environment. As indicated by the table 260, a first user movement during the time period associated with Audio Frame A is 5 centimeters. For example, the sensor data may indicate a translational value of 5 centimeters corresponding to the time period associated with Audio Frame A. The multimedia device may identify the translation index value of 4 as the largest translation index value that does not exceed the translational value of 5. The multimedia device may determine a first offset value is 1 centimeter (e.g., that a difference between the first translational value and the identified translation index value is 1 centimeter).

During a time period associated with Audio Frame B, the user 202 navigates from the first position to a second position in the visual environment. As indicated by the table 260, a second user movement during the time period associated with Audio Frame B is 4. For example, the sensor data may indicate a translational value of 4 corresponding to the time period associated with Audio Frame B. The multimedia device may generate (or update) a cumulative value based on the sum of the translational value and the first offset value. For example, the multimedia device may increment a cumulative value (which may initially be 0) by 5 (e.g., the sum). The cumulative value may include or correspond to the cumulative value 124 of FIG. 1. The multimedia device may identify the translation index value of 4 as the largest translation index value that does not exceed the cumulative value. The multimedia device may determine a second offset value based on a difference of the sum (cumulative value) and the identified translation index value. For example, the second offset value may be 1 (e.g., the difference between the sum and the identified translation index value). The multimedia device may retrieve a set of audio adjustment values corresponding to the identified translation index value for use in generating a modified spatialized audio signal, as described with reference to FIG. 1. After the set of audio adjustment values is retrieved, the cumulative value may be set to the second offset value (e.g., 1).

During a time period associated with Audio Frame C, the user 202 navigates from the second position to a third position in the visual environment. As indicated by the table 260, a third user movement during the time period associated with Audio Frame C is 2. For example, the sensor data may indicate a translational value of 2 corresponding to the time period associated with Audio Frame C. The multimedia device may increment the cumulative value based on the translational value. For example, the multimedia device may increment the cumulative value (e.g., 1) by 2. The multimedia device may identify the translation index value of 2 as the largest translation index value that does not exceed the cumulative value. The multimedia device may determine a third offset value based on a difference of the cumulative value and the identified translation index value. For example, the third offset value may be 1 (e.g., the difference between the cumulative value and the identified translation index value). The multimedia device may retrieve a set of audio adjustment values corresponding to the identified translation index value for use in generating a modified spatialized audio signal, as described with reference to FIG. 1. After the set of audio adjustment values is retrieved, the cumulative value may be set to the third offset value (e.g., 1).

During a fourth period associated with Audio Frame D, the user 202 navigates from the third position to a fourth position in the visual environment. As indicated by the table 260, a fourth user movement during the time period associated with Audio Frame D is 1. For example, the sensor data may indicate a translational value of 1 corresponding to the time period associated with Audio Frame D. The multimedia device may increment the cumulative value based on the translational value. For example, the multimedia device may increment the cumulative value (e.g., 1) by 1. The multimedia device may identify the translation index value of 2 as the largest translation index value that does not exceed the cumulative value. The multimedia device may determine a fourth offset value based on a difference of the cumulative value and the identified translation index value. For example, the fourth offset value may be 0 because the cumulative value matches the identified translation index value. The multimedia device may retrieve a set of audio adjustment values corresponding to the identified translation index value for use in generating a modified spatialized audio signal, as described with reference to FIG. 1. After the set of audio adjustment values is retrieved, the cumulative value may be set to the fourth offset value (e.g., 0).

Thus, FIG. 2 illustrates an example of applying a movement of a user during a time period associated with a particular audio frame to time periods associated with other audio frames via the offset value. This may be referred to as "spreading" the movement over multiple audio frames. Spreading the movement over multiple audio frames enables a reduction in processing resources as compared to other systems. For example, audio adjustment values may be pre-computed and stored at the memory for use in modifying spatialized audio signals instead of generating audio adjustment values in real-time (or near real-time). A number of sets of audio adjustment values that are stored in the memory may be determined to provide enhanced accuracy without exceeding allotted storage capacity of the memory. Thus, a translational value corresponding to a particular audio frame may not match a translation index value of the sets of audio adjustment values in the memory. Thus, the movement corresponding to the translational value may be spread over multiple frames. Because a user is more likely to notice inconsistencies in visual display than in audio output, spreading the movement over multiple frames may not degrade the audio/visual experience of the user.

Figure 3:
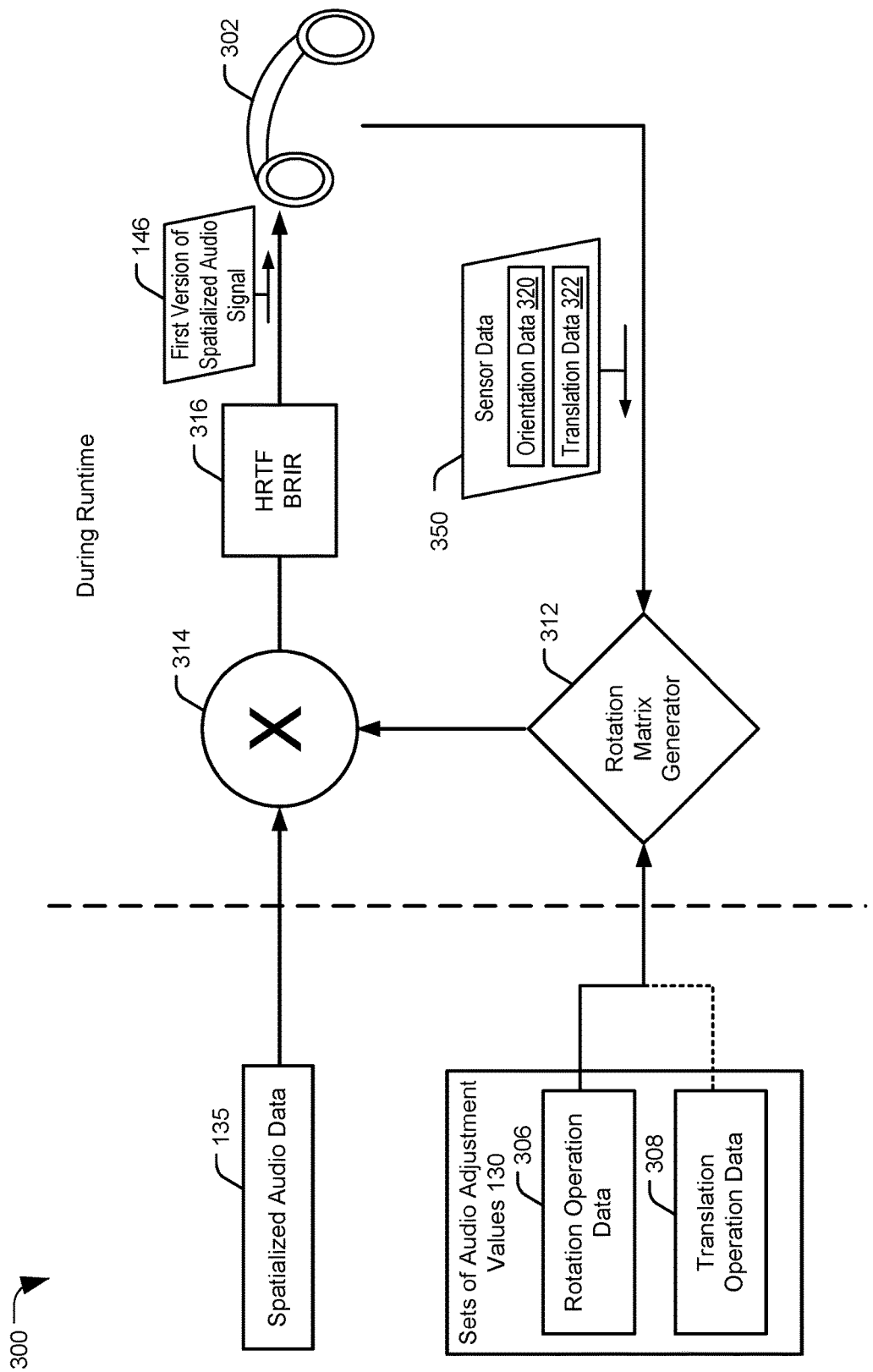
FIG. 3 illustrates a block diagram of an illustrative example of a multimedia device that generates a spatialized audio signal based on sets of audio adjustment values.

FIG. 3 illustrates a multimedia device 300 that generates a spatialized audio signal based on sets of audio adjustment values. The multimedia device 300 may include or correspond to the multimedia device 100 of FIG. 1. The multimedia device 300 may include a memory that stores audio data that corresponds to spatialized audio signals, such as the spatialized audio data 135, and the sets of audio adjustment values 130 of FIG. 1. The spatialized audio data 135 and the sets of audio adjustment values 130 of FIG. 1 may be generated by or received by the multimedia device 300 prior to runtime of an audio/visual program. For example, sets of audio adjustment values for a particular number of translation index values may be generated prior to runtime. The audio/visual program may depict a visual environment, and the visual environment may be associated with a sound field (represented by the spatialized audio signal 134)

During runtime of the audio/visual program, the multimedia device 300 may receive sensor data 350. The sensor data 350 includes orientation data 320 and translation data 322. The multimedia device 300 may retrieve rotation operation data 306 based on the orientation data 320 and the translation data 322. The rotation operation data 306 may be configured to rotate a sound field to align a particular axis of the visual environment with user movement to enable translation along the particular axis (e.g., to enable a user to navigate through the visual environment), may be configured to rotate the sound field to reverse aligning (re-align) the particular axis with the user movement, may be configured to rotate the sound field to account for head rotation of a user indicated by the orientation data 320, or a combination thereof.

The multimedia device 300 may generate a rotation matrix at the rotation generator 312 based on the rotation operation data 306. The rotation matrix may be applied to the spatialized audio signal 134 by arithmetic logic circuitry 314 to generate a rotated spatialized audio signal using the rotation matrix. For example, the arithmetic logic circuitry 314 may perform matrix multiplication to rotate the spatialized audio signal 134. The arithmetic logic circuitry 314 may include adders, multipliers, subtractors, etc., or a combination thereof. Additionally or alternatively, the multimedia device 300 may generate a translation matrix based on translation operation data 308, and the translation matrix may be applied to the spatialized audio signal 134 by the arithmetic logic circuitry 314 to generate a translated spatialized audio signal using the translation matrix.

The multimedia device 300 may further include a binauralizor 316 configured to perform head-related transfer functions (HRTF) and binauralization (e.g., binaural room impulse response (BRIR)) to process the rotated spatialized audio signal 134 to generate the first version of the spatialized audio signal 146, as described with reference to FIG. 7. The multimedia device 300 may output the first version of the spatialized audio signal 146 to a pair of headphones 302.

By generating and storing rotation operation data prior to runtime, runtime operations may use less processing resources as compared to devices that calculate the rotation operation data during runtime. Additionally, by generating and storing translation operation data prior to runtime, runtime operations may use less processing resources as compared to devices that calculate the translation operation data during runtime.

Figure 4:
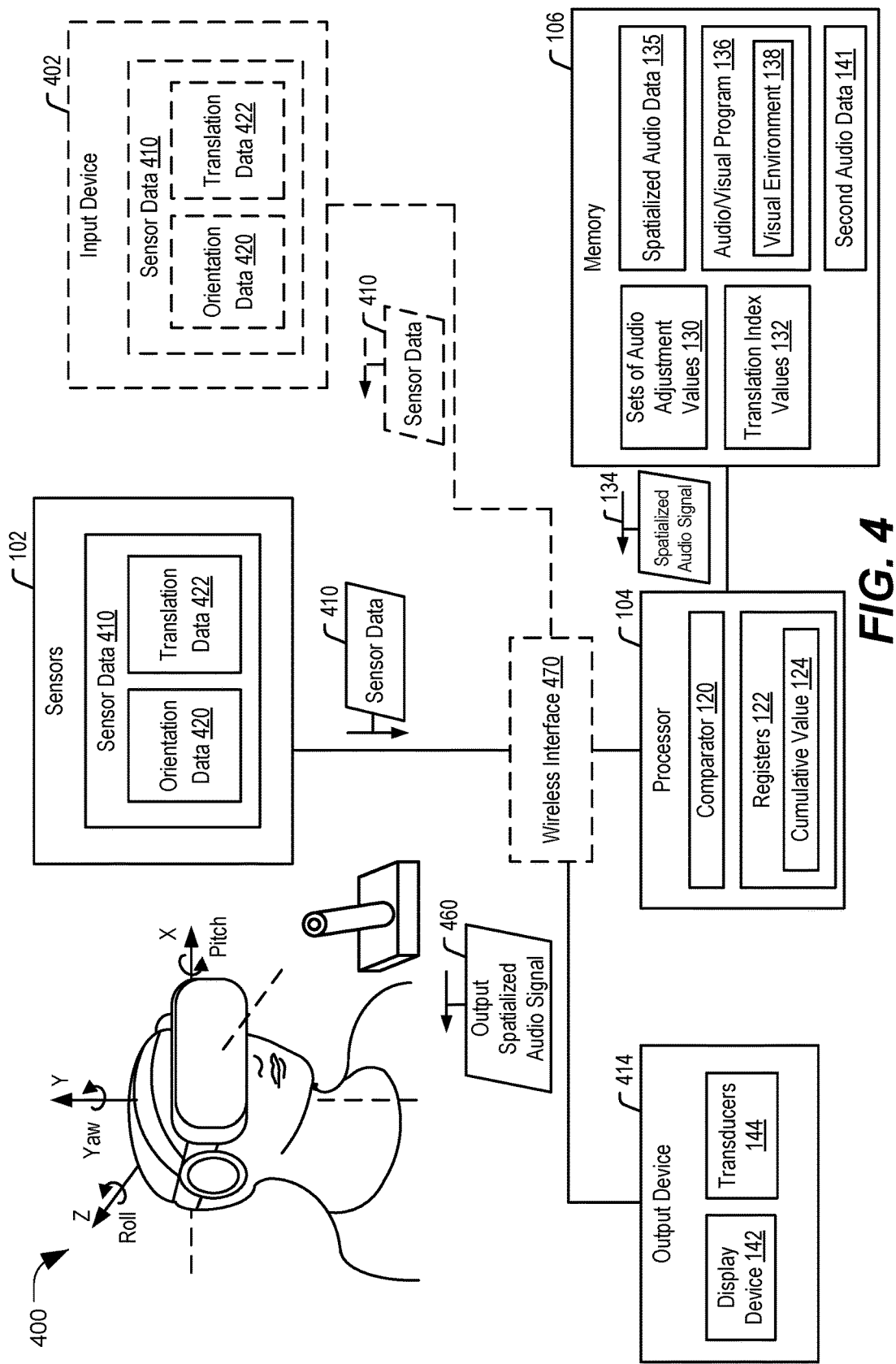
FIG. 4 illustrates a block diagram of a first aspect of a multimedia system that generates spatialized audio signals based on sensor data.

Referring to FIG. 4, a block diagram of a first aspect of a multimedia system that generates spatialized audio signals based on sensor data is shown and generally designated 400. The multimedia system 400 includes the one or more sensors 102, the processor 104, the memory 106, and an output device 414. In some implementations, the multimedia system 400 may include an input device 402 and a wireless interface 470. In a particular implementation, the processor 104, the memory 106, the input device 402, the wireless interface 470, and the output device 414 are integrated into a single device. In other implementations, one or more of the processor 104, the memory 106, the input device 402, and the output device 414 are distinct (e.g., integrated into different devices) and coupled (e.g., wirelessly coupled) to the other components of the multimedia system 400. Thus, the multimedia system 400 may be a distributed system.

The processor 104 may be coupled to the memory 106. The one or more sensors 102, the input device 402, and the output device 414 may be coupled to the processor 104. In a particular implementation, the one or more sensors 102, the input device 402, and the output device 414 are wireless coupled to the processor 104, such as via the wireless interface 470. For example, the one or more sensors 102, the input device 402, and the output device 414 may be configured to wireless transmit data to, or wirelessly receive data from, the processor 104.

In FIG. 4, the multimedia system 400 includes or corresponds to a virtual reality system. The virtual reality system may include a HMD and a headset (e.g., a pair of headphones). The HMD and the headset may be referred to as a wearable multimedia display device. Thus, the processor 104, the one or more sensors 102, the output device 414 that includes the display device 142, and at least two speakers (e.g., the transducers 144) may be integrated in a wearable multimedia display device. The HMD may include a display screen (or multiple display screens, such as two display screens in a pair of eyepieces) that is configured to display a visual environment to the user. The headset may be configured to generate a spatialized audio output associated with the visual environment. To illustrate, the multimedia system 400 may be configured to play a video game, the HMD may be configured to display a visual environment of the video game, and the headset may be configured to playback spatialized audio associated with the video game. As another example, the multimedia system 400 may be configured to view a movie or other multimedia program, the HMD may be configured to display a visual environment associated with the movie, and the headset may be configured to playback spatialized audio corresponding to an audio track of the movie.

The one or more sensors 102 may be configured to generate sensor data 410. For example, the one or more sensors 102 may include an accelerometer, a gyro sensor, an orientation sensor, a linear position sensor, a proximity sensor, a motion sensor, an angular position sensor, a global positioning system (GPS) sensor, an ultrasound sensor, or any other sensor(s) capable of determining a translational position (e.g., a location in a coordinate space, such as x-y-z coordinates) of the multimedia system 400, an orientation (e.g., pitch, yaw, and roll angles) of the multimedia system 400, or both. The one or more sensors 102 may be affixed to or integrated in the multimedia system 400. In some implementations, the multimedia system 400 may be worn on the user's head, and thus the sensor data 410 may represent the position and orientation of the user's head. For example, the user may navigate the visual environment by moving (e.g., translating) or by orienting their head. The user's translation and head orientation may be mapped to a translation and an orientation in the visual environment. For example, when the user takes a step forward and turns her head to the left, navigation in the visual environment may include a forward translation and an orientation to the left.

The sensor data 410 includes orientation data 420 and translation data 422. As illustrated in FIG. 4, the translation data 422 may include x-y-z coordinates (e.g., translational position data) that indicate a translational position of the user (or the multimedia system 400). In some examples, the translational position of the user may be relative to a fixed origin, such as the center of a room or a visual (e.g., virtual reality) environment, the position of the user when playback of a file or streaming of content began, etc. Additionally, the orientation data 420 may include angles of roll, pitch, and yaw, which indicate orientation of the user (or the multimedia system 400) with respect to the coordinate planes. In some examples, the orientation angles may be relative to a fixed origin, such as the origin of a gyro sensor. Thus, in at least some implementations, the sensor data 410 includes six measurements (e.g., an x coordinate value, a y coordinate value, a z coordinate value, a roll angle, a pitch angle, and a yaw angle). In other implementations, one or more of the six measurements are not included in the sensor data 410, or the sensor data 410 includes additional measurements, such as movement, velocity, acceleration, or others.

In some implementations, in addition to (or instead of) including the sensors 102, the multimedia system 400 includes the input device 402. The input device 402 may include one or more sensors configured to generate the sensor data 410. The input device 402 may be a user input device that is configured to generate the sensor data 410 based on a user input. For example, the input device 402 may include a joystick, a touchpad, a game controller, a remote controller, a gesture control device, a mouse, a keyboard, or another type of user input device. The sensor data 410 may be generated by one or more sensors in the input device 402, such as sensors that track an orientation of a joystick, or touch sensors configured to detect a user's touch, as two non-limiting examples. The sensor data 410 may include or be indicative of the orientation data 420 and the translation data 422. For example, the sensor data 410 may include data indicative of a direction that a joystick is manipulated (e.g., the orientation data 420) and an amount that the joystick is manipulated in the direction (e.g., the translation data 422).

The processor 104 may include the comparator 120 and the one or more registers 122, as described with reference to FIG. 1. To illustrate, the comparator 120 may be configured to compare two values and to output a difference, such as a difference between two position values (e.g., translation values) indicated by the translation data 422 or a difference between two orientation values indicated by the orientation data 420. Additionally or alternatively, the comparator 120 may compare a value (e.g., a difference between two values) to another value (e.g., a translation index value) to generate an offset, as further described with reference to FIG. 1. The one or more registers 122 may be configured to store the cumulative value 124, as described with reference to FIG. 1.

The memory 106 may be coupled to the processor 104 and may be configured to store data and instructions used to generate a visual display and to generate spatialized audio data. For example, the memory 106 may be configured to store the sets of audio adjustment values 130, the translation index values 132, the spatialized audio data 135, the audio/visual program 136, and the second audio data 141.

The output device 414 may be coupled to the processor 104 (e.g., via the wireless interface 470) and may be configured to generate visual and audio outputs to a user. The output device 414 may include the display device 142 and the transducers 144 of FIG. 1. The display device 142 may be coupled to the processor 104 and configured to display visual content associated with a multimedia program (e.g., the audio/visual program 136). The output device 414 may also include at least two speakers (e.g., the transducers 144) that are coupled to the processor 104 and configured to generate audio output based on an output spatialized audio signal 460 from the processor 104. To illustrate, the output spatialized audio signal 460 may include the first version of the spatialized audio signal 146 of FIG. 1, the second version of the spatialized audio signal 148 of FIG. 1, or both, and the at least two speakers (e.g., the transducers 144) may be configured to generate a first audio output based on the first version of the spatialized audio signal 146 and to generate a second audio output based on the second version of the spatialized audio signal 148. The audio output generated based on the output spatialized audio signal 460 may enable user perception of changes in distance and direction of sounds based on the user's navigation through the visual environment 138 associated with the audio/visual program 136.

In a particular implementation, the multimedia system 400 includes multiple devices and is a distributed system. To illustrate, the multimedia system 400 may include a mobile device (e.g., a mobile phone or other mobile device) that includes the processor 104 and the memory 106. In this implementation, the display device 142 includes a display of the mobile device, and the mobile device is coupled to a head-mounted apparatus (e.g., the HMD). For example, the HMD may include eyepieces that are configured to be removably coupled to a display of a mobile device. Thus, the mobile device may display the visual environment 138 and may generate the output spatialized audio signal 460 that is provided to the transducers 144 within the headset. The sensor data 410 may be received from one or more sensors integrated in (or coupled to) a head-mounted apparatus (e.g., the HMD and the headset). In other implementations, the one or more sensors 102 may be included in the mobile device, and the mobile device may generate the sensor data 410.

In another particular implementation, the processor 104 and the memory 106 may be included in a mobile device, however a display of the mobile device does not serve as the display device 142. Instead, the HMD includes the display device 142. The mobile device may process the spatialized audio signals and visual data to provide output data (e.g., the output spatialized audio signal 460 and output visual data) to the output device 414. For example, the processor 104 of the mobile device may be configured to generate visual data based on the visual environment 138 and to provide the visual data to the display device 142 for display to the user. Additionally, the processor 104 of the mobile device may be configured to process the spatialized audio signal 134 (e.g., based on the sensor data 410, as described with reference to FIG. 1) to generate the output spatialized audio signal 460, and the processor 104 may provide the output spatialized audio signal 460 to the transducers 144 (e.g., the speakers of the headset) for output to the user. In other implementations, each of the components of the multimedia system 400 may be integrated in a single device, such as a single wearable virtual reality device.

During operation, the multimedia system 400 may execute the audio/visual program 136. The processor 104 may initiate display of the visual environment 138 at the display device 142, and the transducers 144 may output audio content associated with the audio/visual program 136. The user may navigate in the visual environment 138. For example, the user may move (e.g., translate) or rotate her head, or the user may provide an input to the input device 402. The one or more sensors 102 (or the input device 402) may generate the sensor data 410, and the sensor data 410 may be provided to the processor 104. The sensor data 410 may indicate that the user has navigated from a first position to a second position. The processor 104 may generate modified visual data based on a difference between the first position and the second position, and the processor 104 may initiate display of the modified visual data at the display device 142.

The processor 104 may process the spatialized audio signal 134 based on the sensor data 410. For example, the processor 104 may determine a difference between the first position and the second position, and the processor 104 may generate the output spatialized audio signal 460 based on the difference. To illustrate, the processor 104 may select a largest translation index value of the translation index values 132 that does not (e.g., fails to) exceed the difference, and the processor 104 may retrieve a corresponding set of audio adjustment values from the sets of audio adjustment values 130 for use in generating the output spatialized audio signal 460, as further described with reference to FIG. 1. If the difference does not match the selected translation index value, an offset value may be determined, and the cumulative value 124 may be adjusted, as described with reference to FIG. 1. In this manner, modification of the spatialized audio signal 134 based on a particular movement (e.g., a change in translation, orientation, or both) may be spread out and applied to multiple audio frames of the output spatialized audio signal 460, as further described with reference to FIG. 1. The output spatialized audio signal 460 may be provided to the output device 414, and an audio output may be generated by the transducers 144 based on the output spatialized audio signal 460.

The multimedia system 400 of FIG. 4 may thus enable generation of spatialized audio output using fewer processing resources than other systems. For example, because the sets of audio adjustment values 130 are stored in the memory 106, instead of being generated in real-time, the multimedia system 400 may be able to process spatialized audio signals using fewer processing resources than other systems. Additionally, the multimedia system 400 (e.g., the wearable multimedia display device) may provide an immersive audio/visual experience to a user.

Figure 5:
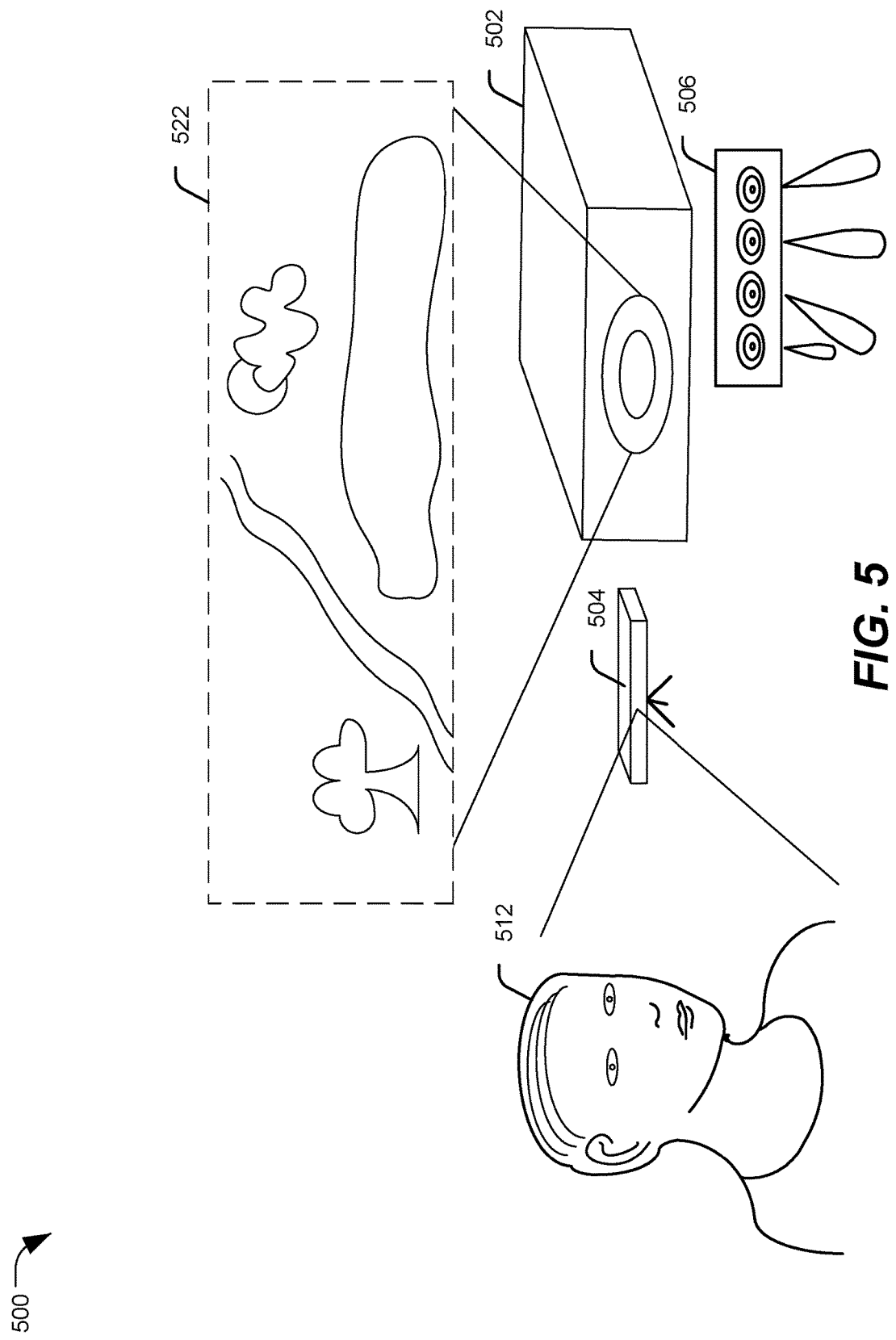
FIG. 5 illustrates a block diagram of a second aspect of a multimedia system that generates spatialized audio signals based on sensor data.

Referring to FIG. 5, a diagram of a second aspect of a multimedia system that generates spatialized audio signals based on sensor data is shown and generally designated 500. The multimedia system 500 includes a projection device 502, a sensor device 504, and a speaker array 506. The multimedia system 500 may also include the processor 104 and the memory 106 of FIG. 1, which are not illustrated for convenience. The projection device 502, the sensor device 504, the speaker array 506, and the processor 104 may be distinct components and may be wireless coupled together.

The projection device 502 may be configured to project one or more visual projections associated with an audio/visual program, such as the audio/visual program 136 of FIG. 1. For example, the projection device 502 may be configured to project one or more visual projections 522 of the visual environment 138. To illustrate, the projection device 502 may project light-based images onto one or more projection screens, one or more walls, or one or more other surfaces. The one or more visual projections 522 may display the visual environment to a user 512. As a particular example, the projection device 502 may include four projectors, and each projector may project an image onto one of four walls of a room. The one or more visual projections 522 may enable the user 512 to perceive the visual environment as though the user was located in the visual environment. The one or more visual projections 522 may be modified based on user movement, or based on user input received via an input device, as described with reference to FIGS. 1 and 4.

The sensor device 504 may include one or more sensors configured to determine a position and an orientation of the user 512. For example, the sensor device 504 may include a camera or another optical device configured to determine the position and the orientation of the user 512. In another particular implementation, the sensor device 504 includes other movement sensors, such as position sensors, accelerometers, orientation sensors, etc., that are worn by (e.g., coupled to) the user 512. The sensor device 504 may be configured to generate sensor data, such as the first sensor data 150 and the second sensor data 152 of FIG. 1, that is indicative of a translation (e.g., a position) and an orientation of the user 512. The sensor data may be provided to the processor 104 for use in generating output spatialized audio signals, as further described with reference to FIG. 1. Additionally or alternatively, the multimedia system 500 may include an input device that is configured to generate sensor data, as further described with reference to FIG. 4.

The speaker array 506 may be configured to generate audio output based on spatialized audio signals. To illustrate, the speaker array 506 may include one or more transducers (e.g., loud speakers) that are configured to generate audio outputs using beamforming (e.g., generating audio outputs, such as audio waves, that are directed in particular directions). For example, the speaker array 506 may include one or more audio amplifiers and one or more audio filters configured to implement beamforming to direct audio waves (e.g., audio outputs) in particular directions. In this implementation, the speaker array 506 (e.g., the audio filters) is configured to direct the audio output (e.g., the audio waves) in particular directions based on spatialized audio signals. The audio outputs may be directed using beamforming to simulate an audio environment associated with audio/visual program. For example, the speaker array 506 may generate an output that enables user perception of a distance and a direction of a sound. As an illustration, a bird may chirp to the right of the user in the visual environment, and the speaker array 506 may be configured to generate an output of a bird chirp that, due to the beamforming, is perceived by the user 512 as being to the right of the user 512. The beamforming may include filtering one or more audio signals based on one or more filter coefficients that are determined by the processor 104.

During operation, the multimedia system 500 device operates similarly to the multimedia system 400 of FIG. 4. For example, the processor 104 may generate visual data of the visual environment for display to the user 512. The visual data may be used to generate the one or more visual projections by the projection device 502. The user 512 may navigate the virtual environment by moving. For example, the user 512 may walk forward (or simulate walking) and turn to the left to translate forward and rotate to the left in the visual environment. The sensor device 504 may capture sensor data based on the movements of the user 512, and the sensor data may be provided to the processor 104. The processor 104 may generate modified visual data based on the sensor data, and the modified visual data may be used to modify the one or more visual projections.

Additionally, the processor 104 may generate an output spatialized audio signal and may initiate one or more audio outputs at the speaker array 506 based on the output spatialized audio signal. For example, the processor 104 may generate one or more control signals or one or more filter coefficients for use by the audio filters of the speaker array 506 to perform the beamforming when generating the audio outputs. The output spatialized audio signal may enable user perception of a change in a direction or a distance of a sound that corresponds to a change in the visual representation of the visual environment. For example, the projection device 502 may project a display of the visual environment based on the modified visual data, and the speaker array 506 (e.g., two or more speakers) may generate an audio output based on a first version (e.g., an output version) of a spatialized audio signal. The movement indicated by the sensor data may be quantized, and modifications to the spatialized audio signal based on the movement may be spread across multiple audio frames, as described with reference to FIG. 1.

The multimedia system 500 of FIG. 5 may thus enable generation of spatialized audio output using fewer processing resources than other systems. For example, because sets of audio adjustment values are stored in a memory, instead of being generated in real-time, the multimedia system 500 may be able to process spatialized audio signals using fewer processing resources than other systems. Additionally, the multimedia system 500 may provide 3D audio to a user using beamforming. The combination of 3D audio and the visual projections of the visual environment may provide an immersive audio/visual experience to a user.

Figure 6:
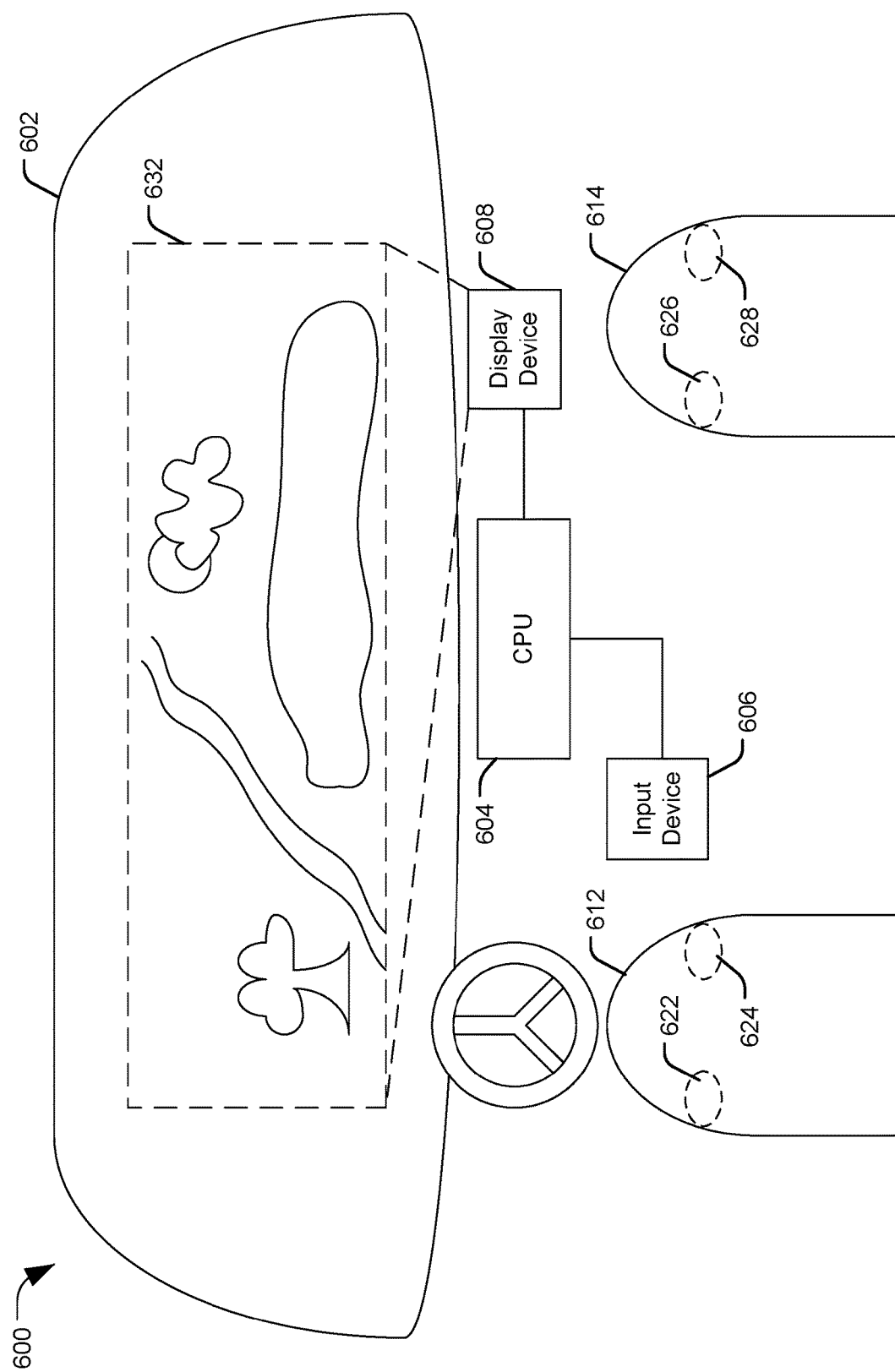
FIG. 6 illustrates a block diagram of a third aspect of a multimedia system that generates spatialized audio signals based on sensor data.

Referring to FIG. 6, a diagram of a third aspect of a multimedia system that generates spatialized audio signals based on sensor data is shown and generally designated 600. The multimedia system 600 may be included in a vehicles, such as a car, a truck, a boat, an airplane, a helicopter, or another type of vehicle. In some implementations, the vehicle is an autonomous vehicle.

The multimedia system 600 includes a central processing unit (CPU) 604, an input device 606, a display device 608, and a plurality of speakers 622, 624, 626, and 628. The CPU 604, the input device 606, the display device 608, and the plurality of speakers 622, 624, 626, and 628 may be distinct components and may be wirelessly coupled together. Additionally or alternatively, the CPU 604, the input device 606, the display device 608, and the plurality of speakers 622,

624, 626, and 628 may be coupled by wires or may be integrated together in a single component or device.

The display device 608 may be configured to project one or more visual projections associated with an audio/visual program, such as the audio/visual program 136 of FIG. 1. For example, the display device 608 may be configured to project one or more visual projections 632 of the visual environment 138 of FIG. 1. To illustrate, the display device 608 may project images onto a windshield 602 of the vehicle. The one or more visual projections 632 may display the visual environment to a user. The one or more visual projections 632 may enable the user to perceive the visual environment as though the user was located in the visual environment. The one or more visual projections 632 may be modified based user input received via the input device 606. In a particular implementation, the audio/visual program may be associated with a navigation program for the vehicle. For example, the vehicle may be an autonomous or semi-autonomous vehicle, and the audio/visual program may enable a user to operate or issue commands to the vehicle. In other implementations, the audio/visual program includes a different program, such as a video game, a movie, an interactive program, a video-conferencing application, or other programs.

The input device 606 may include one or more sensors configured to generate sensor data. The input device 606 may be configured to generate the sensor data based on a user input. For example, the input device 606 may include a joystick, a touchpad, a game controller, a remote controller, a gesture control device, a mouse, a keyboard, or another type of user input device. The sensor data may include or correspond to the first sensor data 150 and the second sensor data 152 of FIG. 1, and may be indicative of a translation (e.g., a position) and an orientation of the user in the visual environment.

The sensor data may be provided to the CPU 604 for use in generating output spatialized audio signals, as further described with reference to FIG. 1. For example, the CPU 604 may be configured to generate a first version of a spatialized audio signal based on the sensor data. The CPU 604 may be further configured to quantize movement indicated by the sensor data, to retrieve a set of audio adjustment values from a memory based on a corresponding translational index value, and to spread the effects of the movement of the spatialized audio signal over multiple audio frames, as described with reference to FIG. 1.

The multimedia system 600 also includes a first speaker 622, a second speaker 624, a third speaker 626, and a fourth speaker 628. A pair of speakers may be integrated into a seat within the vehicle. For example, the first speaker 622 and the second speaker 624 may be integrated within a driver's seat 612 of the vehicle, and the third speaker 626 and the fourth speaker 628 may be integrated within a passenger's seat 614 of the vehicle. The speakers 622-628 may be configured to generate audio output based on spatialized audio signals from the CPU 604. The audio outputs may enable user perception of a direction or a distance of a sound corresponding to the visual environment. For example, a bird may chirp to the right of the user in the visual environment, and the speakers 622-628 may be configured to generate an audio output of a bird chirp that is perceived by the user as being to the right of the user. Speakers integrated in each seat may provide the audio outputs to a corresponding user. For example, speakers integrated in the driver's seat 612 may provide audio outputs to a driver of the vehicle, and speakers integrated in the passenger's seat 614 may provide audio outputs to a passenger.

During operation, the multimedia system 600 device operates similarly to the multimedia system 400 of FIG. 4 and the multimedia system 500 of FIG. 5. For example, the CPU 604 may generate visual data of the visual environment for display to the user. The visual data may be used to generate the one or more visual projections by the display device 608. The user may navigate the virtual environment by using the input device 606. The input device 606 may transmit sensor data (or other data) to the CPU 604 that indicates a position, an orientation, or both, of the user in the visual environment. The CPU 604 may generate modified visual data based on the sensor data, and the modified visual data may be used to modify the one or more visual projections.

Additionally, the CPU 604 may generate an output spatialized audio signal and may initiate one or more audio outputs at the speakers 622-628 based on the output spatialized audio signal. The audio outputs may enable user perception of a change in a direction or a distance of a sound that corresponds to a change in the visual representation of the visual environment. For example, the display device 608 may project a display of the visual environment on the windshield 602, and the speakers 622-628 (e.g., two or more speakers) may generate an audio output based on a first version (e.g., an output version) of a spatialized audio signal. The movement indicated by the sensor data may be quantized, and modifications to the spatialized audio signal based on the movement may be spread across multiple audio frames, as described with reference to FIG. 1.

The multimedia system 600 of FIG. 6 may thus enable generation of spatialized audio output using fewer processing resources than other systems. For example, because sets of audio adjustment values are stored in a memory, instead of being generated in real-time, the multimedia system 600 may be able to process spatialized audio signals using fewer processing resources than other systems. Additionally, the multimedia system 600 may provide 3D audio to a user of a vehicle. The combination of 3D audio and the visual projections of the visual environment may provide an immersive audio/visual experience to a user.

Figure 7:
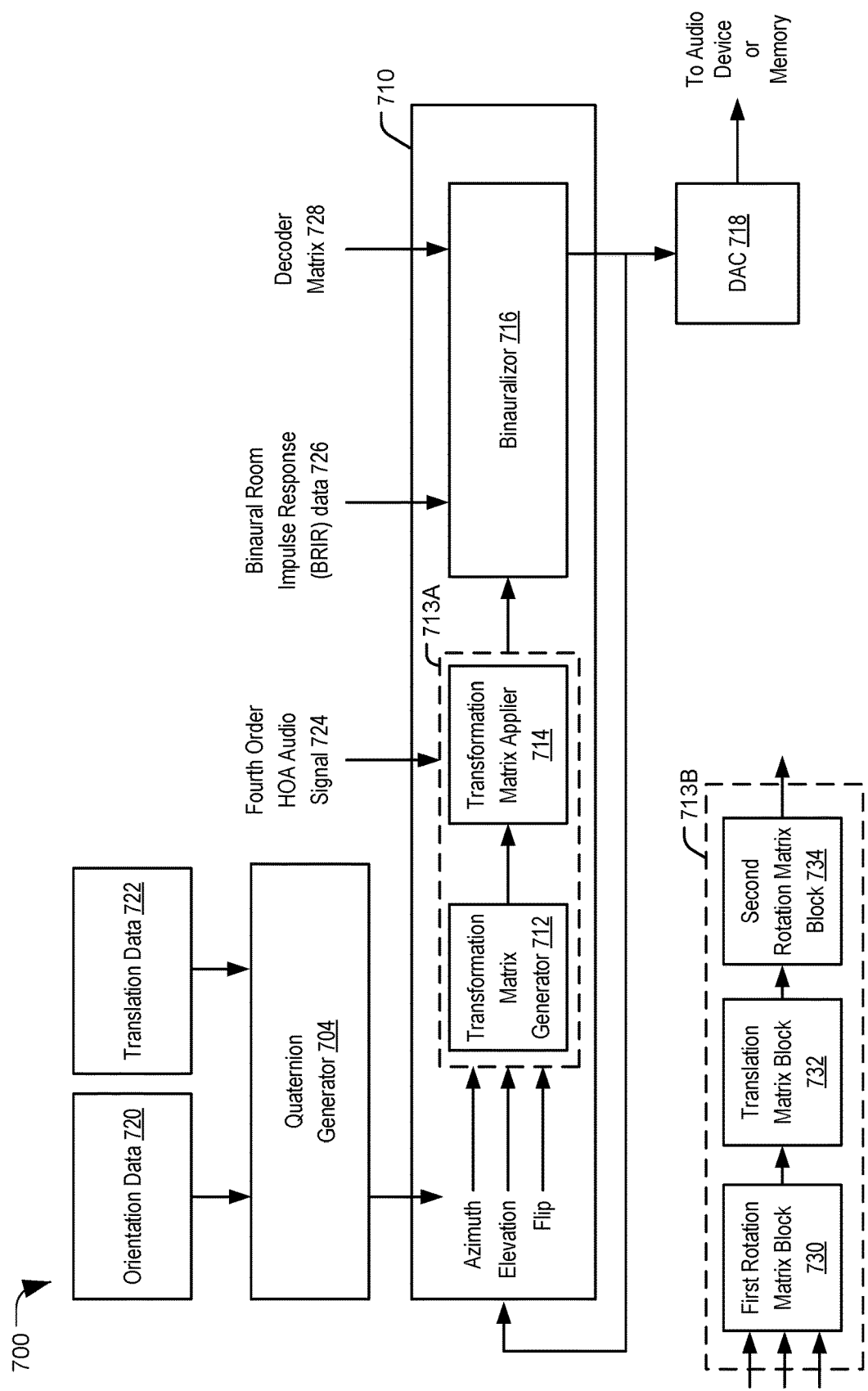
FIG. 7 is a block diagram of an illustrative implementation of an audio processing device configured to perform audio spatialization using sensor data.

Referring to FIG. 7, a block diagram of an illustrative aspect of a multimedia device configured to perform audio spatialization is shown and generally designated 700. The audio processing device 700 includes a quaternion generator 704, audio spatialization circuitry 710, and a digital-to-analog converter (DAC) 718, with respective inputs and outputs coupled as shown. The audio spatialization circuitry 710 includes a transformation block 713A and a binauralizor 716, with respective inputs and outputs coupled as shown. The transformation block 713A includes a transformation matrix generator 712 and a transformation matrix applier 714.

The quaternion generator 704 may be configured to receive orientation data 720 and translation data 722 and to generate quaternion data based on the orientation data 720 and the translation data 722. The orientation data 720 and the translation data 722 may be included in sensor data (e.g., the first sensor data 150 or the second sensor data 152) from the one or more sensors 102 of FIG. 1, or the orientation data 720 and the translation data 722 may be generated based on the sensor data. The orientation data 720 may indicate an orientation of a user within in visual environment, and the translation data 722 may indicate a translation of the user within the visual environment, as described with reference to FIGS. 1-2. The quaternion data may represent the orientation data 720, the translation data 722, or both, in a quaternion format. In some implementations, the quaternion data may indicate an azimuth, an elevation, and a flip associated with the orientation data 720, the translation data 722, or both. Alternatively, the quaternion data may be used to determine the azimuth, the elevation, and the flip using known equations.

The transformation matrix generator 712 may be configured to receive the quaternion data from the quaternion generator 704 and to generate a transformation matrix based on the quaternion data. Although FIG. 7 illustrates that the transformation matrix generator 712 receives the azimuth, the elevation, and the flip individually, this illustration is for convenience and is not to be considered limiting. In some implementations, a portion of the audio spatialization circuitry 710 receives the quaternion data and generates the azimuth, the elevation, and the flip. Alternatively, the transformation matrix generator 712 may receive the quaternion data and may generate the azimuth, the elevation, and the flip. Generating the transformation matrix may include converting the quaternion data to spherical or Cartesian coordinates, rotating the coordinates, applying Eigen microphone (mic) weights, applying higher order ambisonic (HOA) ordering, inverting coordinates, or any combination thereof. Applying the HOA ordering may include multiplying one or more values (e.g., the coordinates or intermediate values) by audio adjustment values (e.g., HOA coefficients) that are retrieved from a memory. For example, the HOA ordering may include multiplying the coordinates (or the intermediate values) by HOA coefficients (e.g., the sets of audio adjustment values 130) from the memory 106 of FIG. 1. The HOA coefficients may include or correspond to a translation matrix or a rotation matrix. Retrieval of the sets of audio adjustment values is further described with reference to FIG. 1.

The transformation matrix applier 714 may be configured to receive the transformation matrix from the transformation matrix generator 712. The transformation matrix applier 714 may be further configured to apply the transformation matrix to a fourth order HOA audio signal 724 to generate audio data. Applying the transformation matrix to the fourth order HOA audio signal 724 may cause a perceived direction or distance of a sound (or sound source) to change. In other implementations, the HOA audio signal may be have less complexity or lower resolution, such as a third order HOA audio signal, or the HOA audio signal may have more complexity or higher resolution, such as a fifth order HOA audio signal. Applying the transformation matrix may include multiplying the rotation matrix by a vector of samples of the fourth order HOA audio signal 724. In some implementations, applying the transformation matrix, also accounts for changes in position. For example, x-y-z coordinate data may be weighted to compensate for changes in position. In other implementations, the transformation matrix generator 712 may apply a different type of spatialized audio processing to the quaternion data, and transformation matrix applier 714 may apply the transformation matrix to a different type of spatialized audio signal or 3D audio signal. Thus, the audio spatialization circuitry 710 is not limited to performing HOA signal processing.

In some implementations, the audio spatialization circuitry 710 does not include the transformation matrix generator 712 and the transformation matrix applier 714. In other implementations, the audio spatialization circuitry 710 may include other components configured to apply a rotation to a spatialized audio signal. For example, the audio spatialization circuitry 710 may include a vector generator, a vector applier, a rotation data set generator, a rotation data set applier, or other circuitry or hardware configured to determine rotation data (e.g., one or more vectors, one or more elements of a data set, one or more elements from a lookup table or database, etc.) and to apply the rotation data to input spatialized audio signals, such as the fourth order HOA audio signal 724, to perform audio spatialization processing.

The binauralizor 716 may be configured to perform binauralization on the audio data based on binaural room impulse response (BRIR) data 726 and based on a decoder matrix 728 to generate a digital spatialized audio signal. Performing binauralization may include convolving the audio data (e.g., the rotated audio samples) with BRIRs (or head related transfer functions (HRTFs)) and decoder matrices. In a particular implementation where the I/O device 114 is a headset or a HMD of a virtual reality system or an AR system, binauralization includes generating a decoder matrix for each ear (e.g., a left decoder matrix for a left transducer of the transducers 144 and a right decoder matrix for a right transducer of the transducers 144) based on the decoder matrix 728, applying the BRIR 726 to the left decoder matrix and to the right decoder matrix to generate BRIR decoder matrices, performing fast Fourier transforms (FFTs) on the BRIR decoder matrices, applying the FFT BRIR decoder matrices to the audio data (e.g., the rotated audio samples generated by the transformation matrix applier 714), performing overlapping addition of the decoded samples, summing the results over multiple channels, or a combination thereof. In other implementations, the audio spatialization circuitry 710 does not include the binauralizor 716, such as in implementations associated with speaker arrays. Additionally or alternatively, one or more other components may be included in the audio spatialization circuitry 710, such as a filter coefficient generator that generates filter coefficients for use in performing beamforming.

The DAC 718 may be configured to receive the digital spatialized audio signal (e.g., the output of the binauralizor 716) and to convert the digital spatialized audio signal to an analog spatialized audio signal. The analog spatialized audio signal may be provided to the audio output port 110 or to the I/O device 114 to generate an audio output, as described with reference to FIG. 1. The digital spatialized audio signal (e.g., the output of the binauralizor 716) may also be provided to a feedback input of the audio spatialization circuitry 710.

In a particular implementation, the transformation block 713A may be replaced with the transformation block 713B. The transformation block 713B includes a first rotation matrix block 730, a translation matrix block 732, and a second rotation matrix block 734. The first rotation matrix block 730 may be configured to generate a first rotation matrix to rotate a spatialized audio signal (e.g., the fourth order HOA audio signal 724) to cause a translation to align with a single coordinate axis. As an example, a particular translation may be a three-dimensional translation (e.g., the translation may occur in an x-direction, a y-direction, and a z-direction). The first rotation matrix block 730 may be configured to generate a first rotation matrix that rotates the spatialized audio signal such that, after application of the first rotation matrix, the translation is aligned with the z-axis. Rotating a spatialized audio signal to align a translation with a single axis may result in simplified calculations that use less processing resources, as compared to generating a translation matrix to account for movement in three dimensions. After the first rotation matrix is generated, the first rotation matrix may be applied to the fourth order HOA audio signal 724 by the first rotation matrix block 730.

The translation matrix block 732 may be configured to generate a translation matrix based on a translation indicated by the translation data 722. Because the translation matrix is generated after the first rotation matrix is applied to the fourth order HOA audio signal 724, the translation matrix may correspond to a one-dimensional translation (e.g., a translation along the z-axis). This translation matrix may be simplified and use fewer processing resources as compared to a three-dimensional translation matrix. After the translation matrix is generated, the translation matrix block 732 may be configured to apply the translation matrix to the fourth order HOA audio signal 724.

The second rotation matrix block 734 may be configured to generate a second rotation matrix that reverses the rotation caused by the first rotation matrix and incorporates a change in orientation indicated by the orientation data 720. To illustrate, if there is no change in orientation, the second rotation matrix may be an inverse of the first rotation matrix. If there is a change in orientation, after application of the second rotation matrix, a rotation of the fourth order HOA audio signal 724 from an original orientation is equal to the change in orientation indicated by the orientation data 720. For example, if the orientation data 720 indicates a change in orientation of 5 degrees in the yaw direction, after application of the second rotation matrix, the fourth order HOA audio signal 724 is rotated by 5 degrees in the yaw direction (and any rotation caused by the first rotation matrix is canceled). After the second rotation matrix is generated, the second rotation matrix may be applied to the fourth order HOA audio signal 724 by the second rotation matrix block 734. Thus, after processing by the transformation block 713B, the fourth order HOA audio signal 724 may be adjusted based on the orientation data 720 and the translation data 722 using fewer processing resources than other systems.

FIG. 7 illustrates a particular implementation of an audio processing device that is configured to process HOA signals using binauralization. However, in other implementations, other types of audio processing may be performed based on the orientation data 720 and the translation data 722. As a particular example, the audio processing device is configured to process object-based 3D audio (e.g., audio having audio sources represented as individual objects with 3D coordinates and directivity). The audio processing device may be configured to re-compute object position(s) in a coordinate system based on the predicted position data prior to performing binauralization (e.g., convolving audio samples with BRIRs or HRTFs). As another example, the audio processing device may be configured to process channel-based surround sound audio signals, such as 5.1 channel audio content, 7.1 channel audio content, 11.1 channel audio content, and 7.1.4 channel audio content. The audio processing device may be configured to treat each speaker as an audio object, and to perform object-based audio processing for each speaker prior to performing binauralization. As another example, the audio processing device may be configured to render HOA audio content to a channel-based format (e.g., 7.1 channel audio content or 11.1 channel audio content, as non-limiting examples), and the rendered signals may be processed as channel-based surround sound audio signals.

Thus, FIG. 7 illustrates a system for generating 3D audio outputs based on orientation data, translation data, or both. In some implementations, the system may perform higher order ambisonic processing, such as fourth order ambisonic processing. The system may generate the 3D audio outputs using fewer processing resources than other systems. For example, the system may generate rotation matrices by retrieving audio adjustment values (e.g., matrices of HOA coefficients) from a memory, which may use less processing resources than generating the rotation matrices by performing real-time computations to generate the audio adjustment values.

Figure 8:
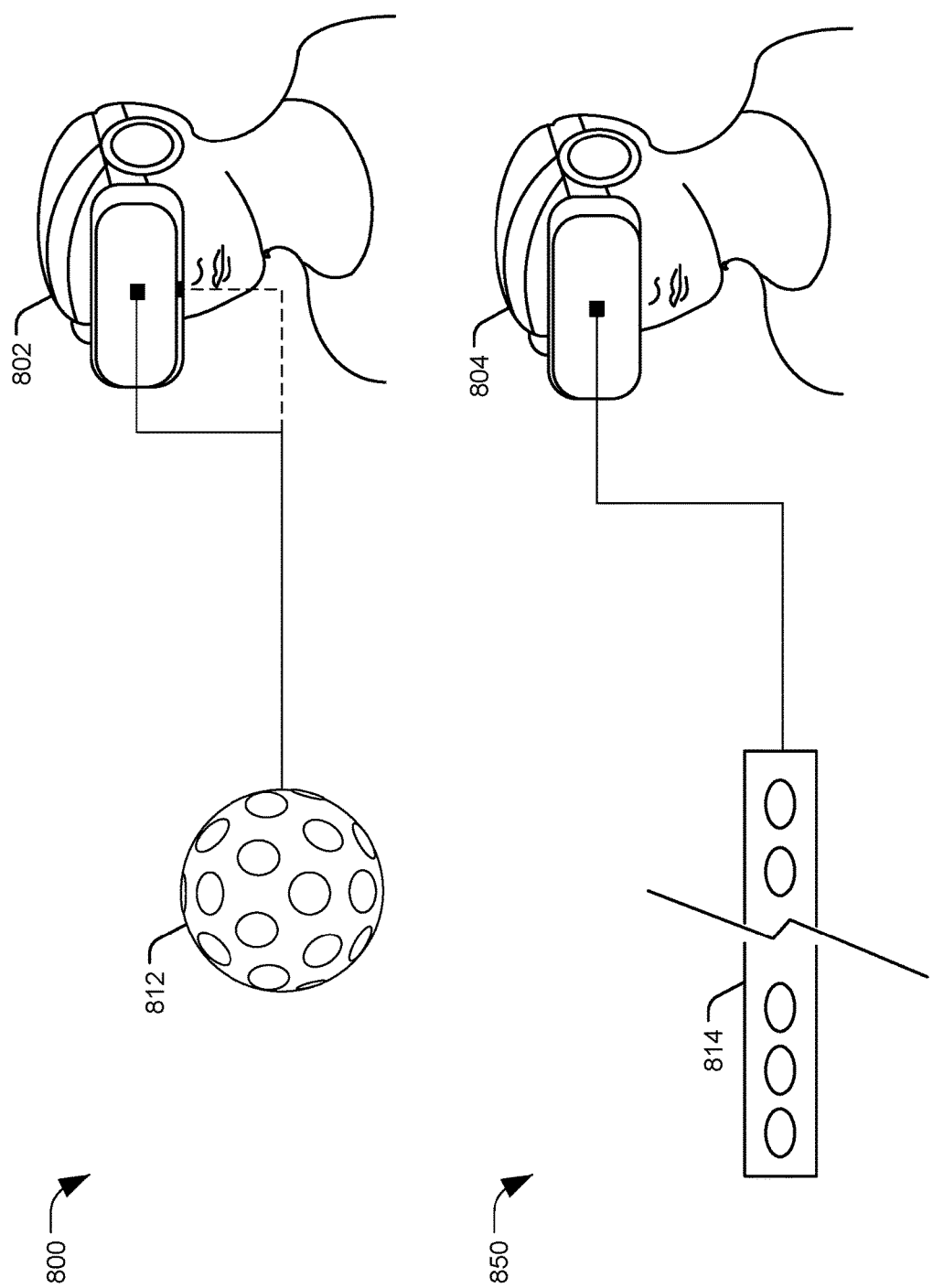
FIG. 8 illustrates example microphone configurations of a multimedia device that generates spatialized audio signals.

Referring to FIG. 8, a first illustrative example of a microphone configuration of a multimedia device that generates spatialized audio signals is shown and generally designated 800, and a second illustrative example of a microphone configuration of a multimedia device that generates spatialized audio signals is shown and generally designated 850.

The first example 800 includes a multimedia device 802 coupled to a multi-dimensional microphone 812. In a particular implementation, the multimedia device 802 includes a HMD and headset, as illustrated in FIG. 8. In other implementations, the multimedia device 802 includes or corresponds to other types of multimedia devices, as described with reference to FIGS. 5-6.

The multi-dimensional microphone 812 may include a plurality of transducers (e.g., microphones) that are configured to capture sound from multiple different directions and angles. To illustrate, the multi-dimensional microphone 812 may include a plurality of transducers (e.g., microphones) arranged about a round (e.g., spherical) surface of the multi-dimensional microphone 812. The multi-dimensional microphone 812 may be integrated within or coupled to the multimedia device 802. The multi-dimensional microphone 812 may be configured to generate a spatialized audio signal, such as the spatialized audio signal 134 of FIG. 1.

The second example 850 includes a multimedia device 804 coupled to a microphone array 814. In a particular implementation, the multimedia device 804 includes a HMD and headset, as illustrated in FIG. 8. In other implementations, the multimedia device 804 includes or corresponds to other types of multimedia devices, as described with reference to FIGS. 5-6.

The microphone array 814 may include a plurality of transducers (e.g., microphones) that are configured to capture sound. The plurality of transducers may be arranged on one or more surfaces of the microphone array 814. The microphone array 814 may be integrated within or coupled to the multimedia device 804. The microphone array 814 may be configured to generate a spatialized audio signal, such as the spatialized audio signal 134 of FIG. 1.

Figure 9:
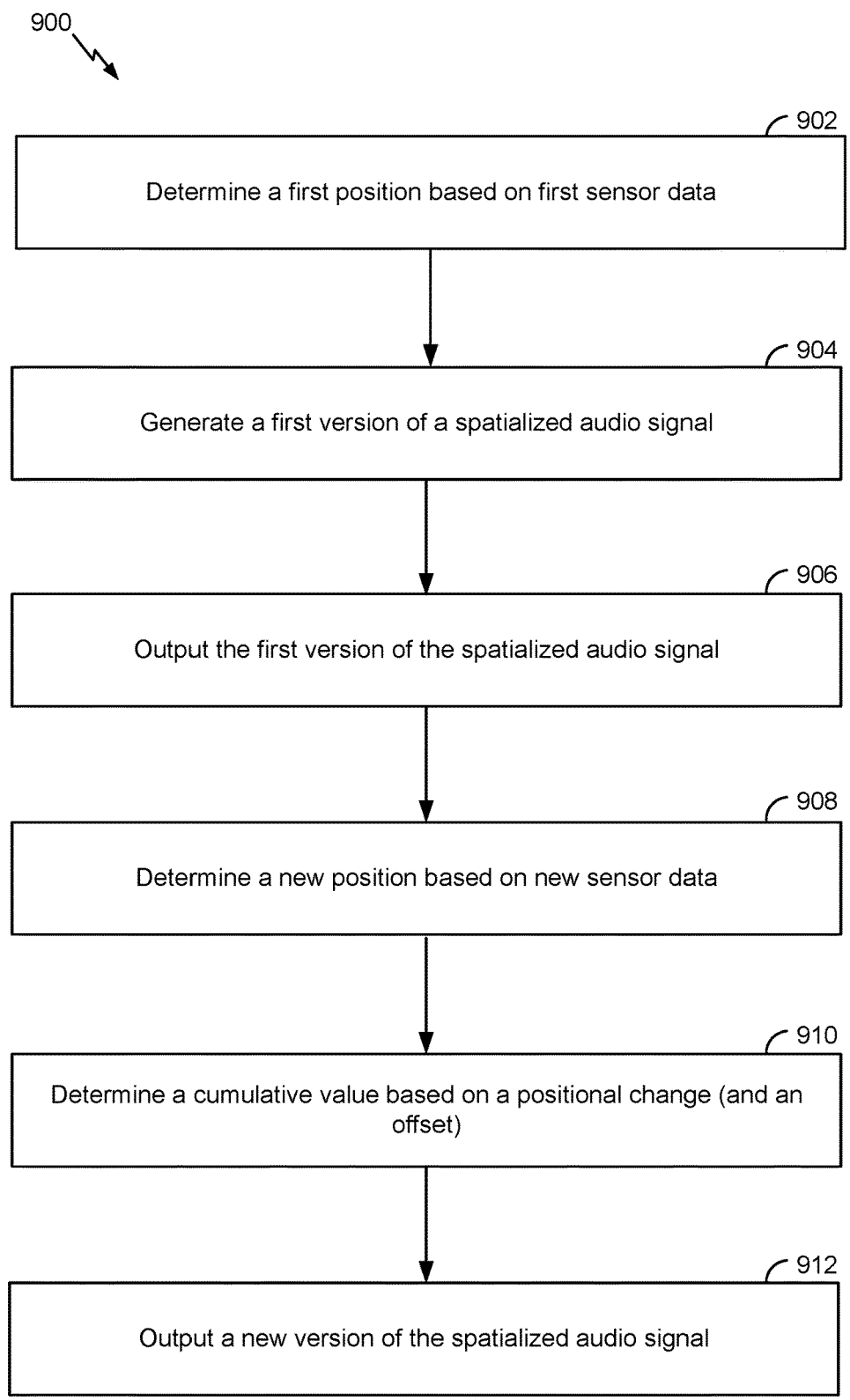
FIG. 9 is a flow chart that illustrates stages of a first method of processing spatialized audio signals.

Referring to FIG. 9, a method 900 of processing spatialized audio signals is shown. In illustrative examples, all or a portion of the method 900 may be performed by a multimedia device or system, such as the multimedia device 100 of FIG. 1, the multimedia device 300 of FIG. 3, the multimedia system 400 of FIG. 4, the multimedia system 500 of FIG. 5, or the multimedia system 600 of FIG. 6.

The method 900 may include determining a first position based on first sensor data, at 902. For example, referring to FIG. 1, the processor 104 may determine a first position based on the first sensor data 150. The first position may correspond to a "real world" position of a user or an object. Alternatively, the first position may correspond to a "virtual" position of a user or an object, such as in an augmented reality or a virtual reality environment.

The method 900 may also include generating a first version of a spatialized audio signal, at 904, and outputting the first version of the spatialized audio signal, at 906. For example, referring to FIG. 1, the first version of the spatialized audio signal 146 may be output to the audio output port 110, to the network interface 112, to the I/O device 114, or a combination thereof.

The method 900 may further include determining a new position based on new sensor data, at 908. The position may be a "new" position by virtue of the position differing from the first position. For example, referring to FIG. 1, the processor 104 may determine a new (e.g., second) position based on the second sensor data 152. Like the first position, the second position may correspond to a "real world" position of a user or an object or to a "virtual" position of a user or an object, such as in an augmented reality or a virtual reality environment.

The method 900 may include determining a cumulative value based on a positional change (and an offset), at 910, and outputting a new version of the spatialized audio signal, at 912. For example, referring to FIG. 1, the processor 104 may determine the cumulative value 124 based on a positional change (and offset), and the second version of the spatialized audio signal 148 may be output to the audio output port 110, to the network interface 112, to the I/O device 114, or a combination thereof.

The method 900 of FIG. 9 may thus enable dynamic adjustment of spatialized audio based on "real world" or "virtual" position changes. Such dynamic adjustment of spatialized audio may result in an improved and more immersive listening experience.

Figure 10:
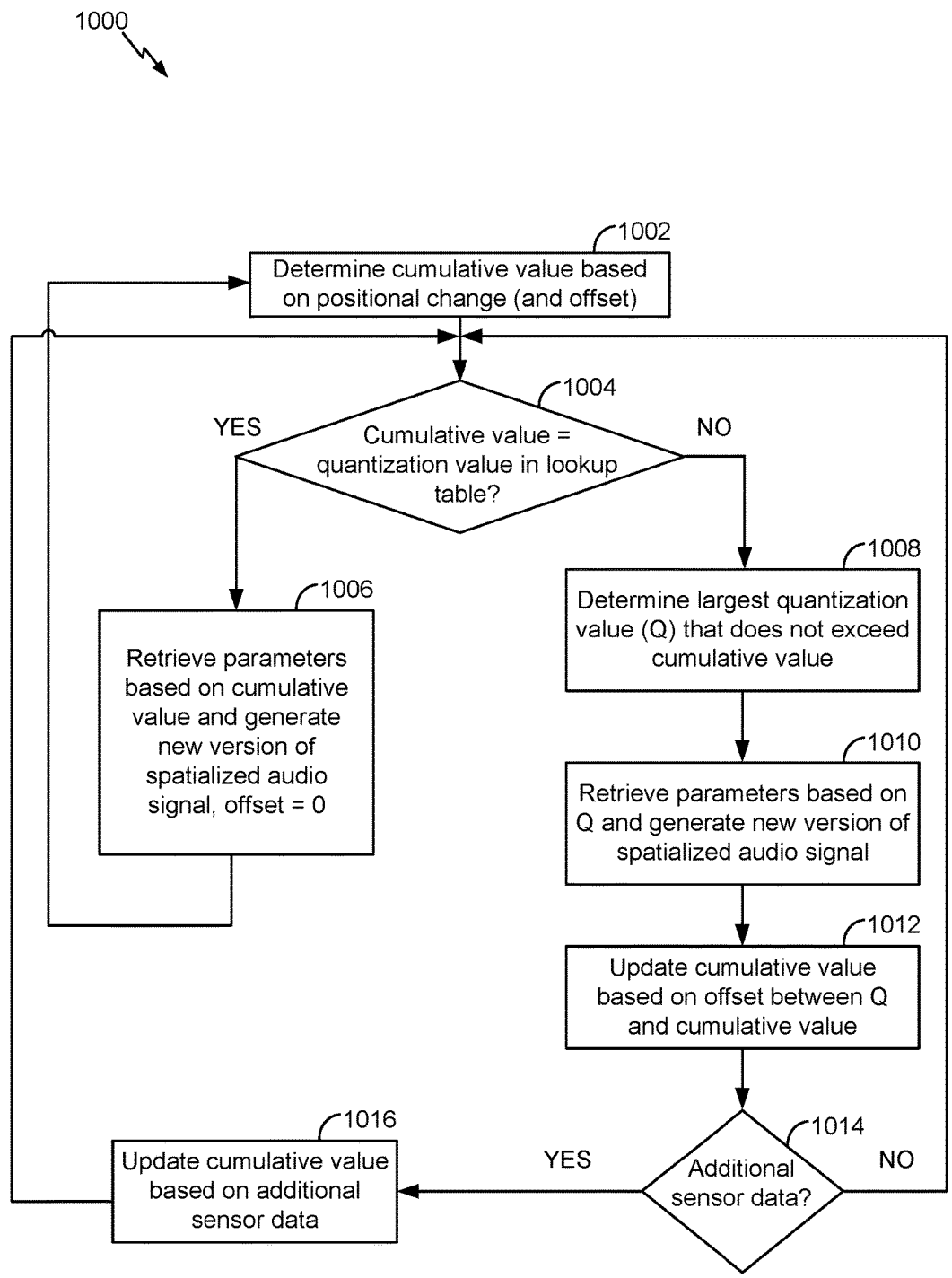
FIG. 10 is a flow chart that illustrates additional stages of the first method of processing spatialized audio signals.

Referring to FIG. 10, a method 1000 of processing spatialized audio signals is shown. In illustrative examples, all or a portion of the method 1000 may be performed by a multimedia device or system, such as the multimedia device 100 of FIG. 1, the multimedia device 300 of FIG. 3, the multimedia system 400 of FIG. 4, the multimedia system 500 of FIG. 5, or the multimedia system 600 of FIG. 6. Moreover, all or a portion of the method 1000 may be performed during the method 900 of FIG. 9.

The method 1000 may include determining a cumulative value based on a positional change (and offset), at 1002. For example, referring to FIG. 1, the processor 104 may determine the cumulative value 124 based on a positional change (and offset). Thus, block 1002 of the method 1000 may correspond to block 910 of the method 900.

The method 1000 may also include determining whether the cumulative value matches a quantization value in a lookup table, at 1004. For example, referring to FIG. 1, it may be determined whether the cumulative value 124 is equal to one of the translation index values 132, which may, in some implementations, be stored in a lookup table.

If the cumulative value matches a quantization value in a lookup table, the method 1000 may include retrieving parameters based on the cumulative value and generating a new version of the spatialized audio signal (e.g., corresponding to a zero offset), at 1006, and returning to 1002. For example, referring to FIG. 1, one or more of the sets of audio adjustment values 130 may be retrieved and may be used to generate the second version of the spatialized audio signal 148.

If the cumulative value is not equal to a quantization value in a lookup table, the method 1000 may include determining a largest quantization value (Q) that does not exceed the cumulative value, at 1008, of retrieving parameters based on Q and generating a new version of the spatialized audio signal, at 1010, and updating the cumulative value based on an offset between Q and the cumulative value, at 1012. For example, referring to FIG. 1, the processor 104 may retrieve one or more of the sets of audio adjustment values 130 based on a largest quantization value (Q) that does not exceed the cumulative value 124, and may update the cumulative value 124 based on an offset between Q and the cumulative value 124.

The method 1000 may further include determining, at 1014, whether additional sensor data is to be considered (e.g., whether additional sensor data has been generated or received). If no additional sensor data is to be considered, the method 1000 may return to 1004. If additional sensor data is to be considered, the method 1000 may include updating the cumulative value (e.g., the cumulative value 124 of FIG. 1) based on the additional sensor data, at 1016, and returning to 1004.

The method 1000 may thus enable iteratively and dynamically determining parameters to be used in adjusting a spatialized audio signal based on quantized positional changes. Adjusting a spatialized audio signal based on positional changes may result in an improved and more immersive user experience.

Figure 11:
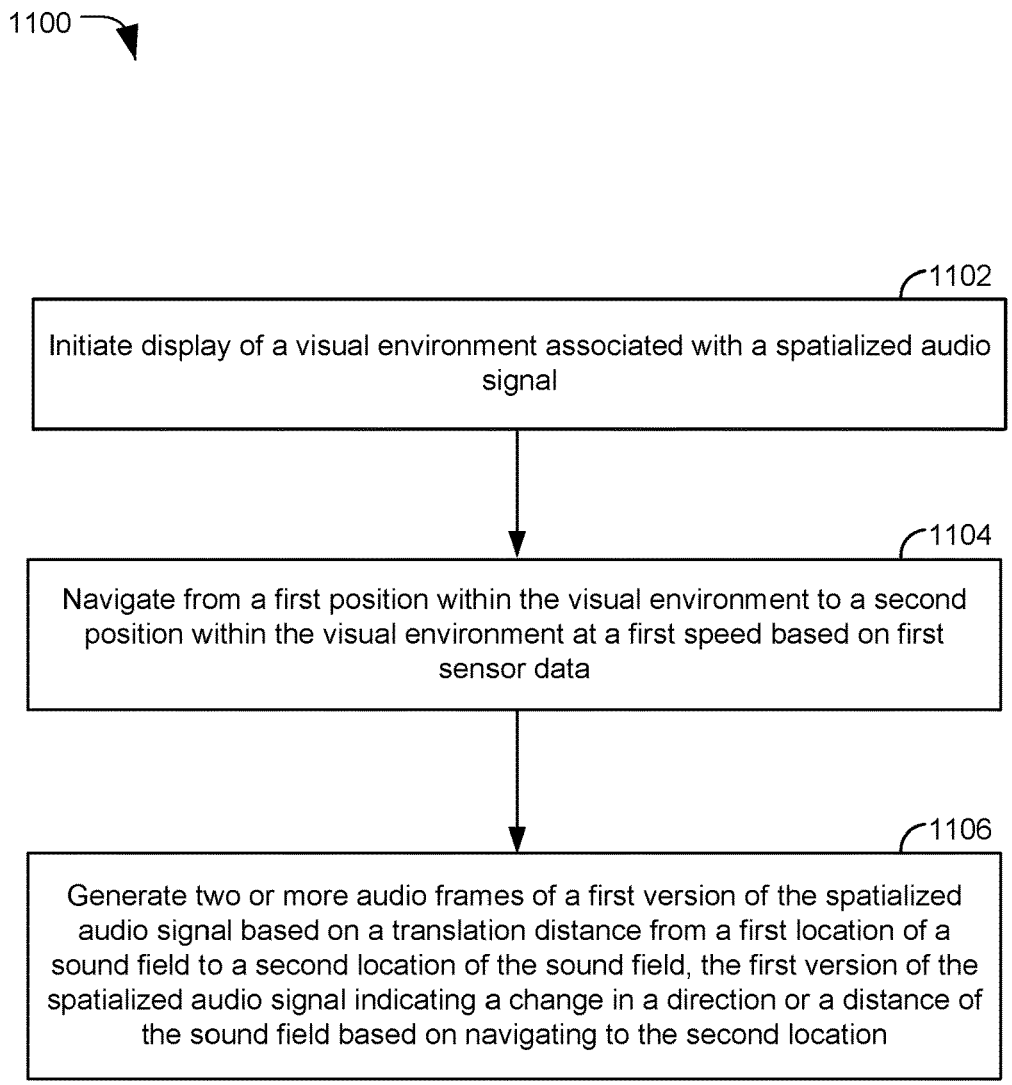
FIG. 11 is a is a flow chart that illustrates an illustrative method of generating audio frames of a spatialized audio signal.

Referring to FIG. 11, a method 1100 of processing spatialized audio signals is shown. In illustrative examples, all or a portion of the method 1100 may be performed by a multimedia device or system, such as the multimedia device 100 of FIG. 1, the multimedia device 300 of FIG. 3, the multimedia system 400 of FIG. 4, the multimedia system 500 of FIG. 5, or the multimedia system 600 of FIG. 6.

The method 1100 may include initiating display of a visual environment associated with a spatialized audio signal, at 1102, and navigating from a first position within the visual environment to a second position within the visual environment at a first speed based on first sensor data, at 1104. For example, referring to FIG. 1, the display device 142 may output a visual environment 138. Responsive to the first sensor data 150 received by the processor 104, the display device 142 may display a navigation from a first position to a second position at a first speed, where the first speed is based on the first sensor data 150.

The method 1100 may further include generating two or more audio frames of a first version of the spatialized audio signal based on a translation distance from a first location of a sound field to a second location of the sound field, at 1106. The first version of the spatialized audio signal may indicate a change in a direction or a distance of the sound field based on navigating to the second location. For example, referring to FIG. 1, two or more audio frames of the first version of the spatialized audio signal 146 may be generated and output.

The method 1100 of FIG. 11 may thus enable generation of spatialized audio signal that "match" movement vectors in a visual environment, which may enable an improved and more immersive user experience with respect to the visual environment. For example, a user experience may be improved and more immersive because visual movement and audio are perceived to be in "positional synchronization."

Figure 12:
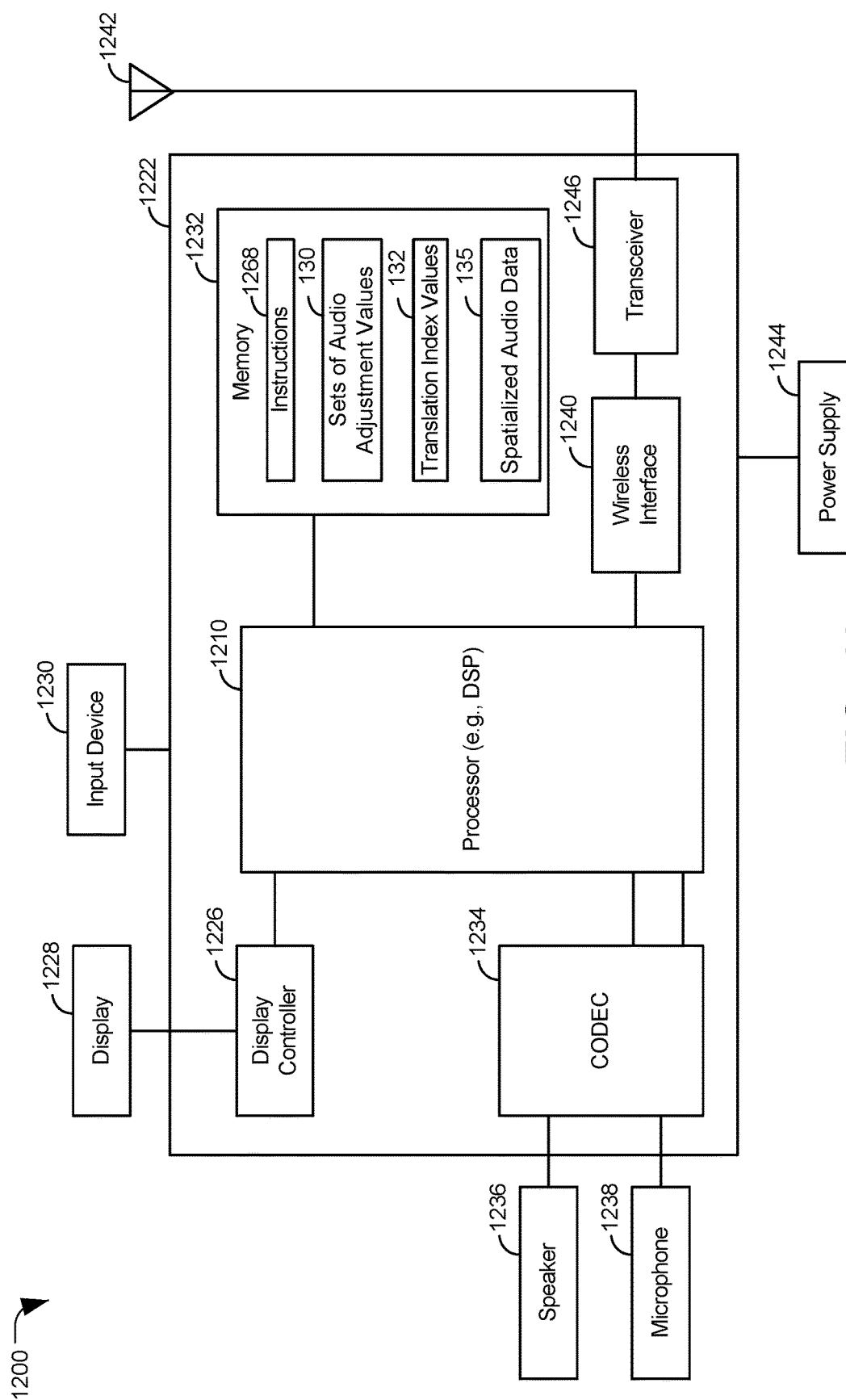
FIG. 12 a block diagram of a wireless device that is operable to perform operations in accordance with the systems and methods of FIGS. 1-11.

Referring to FIG. 12, a block diagram of a particular illustrative implementation of a device (e.g., a wireless communication device) is depicted and generally designated 1200. In various implementations, the device 1200 may have more components or fewer components than illustrated in FIG. 12.

In a particular implementation, the device 1200 includes a processor 1210, such as a central processing unit (CPU) or a digital signal processor (DSP), coupled to a memory 1232. The processor 1210 may include or correspond to the processor 104 of FIGS. 1 and 4, to the CPU 604 of FIG. 6, or a combination thereof.

The memory 1232 includes instructions 1268 (e.g., executable instructions) such as computer-readable instructions or processor-readable instructions. The instructions 1268 may include one or more instructions that are executable by a computer, such as the processor 1210. In some implementations, the memory 1232 also includes the sets of audio adjustment values 130, the translation index values 132, and the spatialized audio signal 134.

FIG. 12 also illustrates a display controller 1226 that is coupled to the processor 1210 and to a display 1228. A coder/decoder (CODEC) 1234 may also be coupled to the processor 1210. A speaker 1236 and a microphone 1238 may be coupled to the CODEC 1234.

FIG. 12 further illustrates that a wireless interface 1240, such as a wireless controller, and a transceiver 1246 may be coupled to the processor 1210 and to an antenna 1242, such that wireless data received via the antenna 1242, the transceiver 1246, and the wireless interface 1240 may be provided to the processor 1210. In some implementations, the processor 1210, the display controller 1226, the memory 1232, the CODEC 1234, the wireless interface 1240, and the transceiver 1246 are included in a system-in-package or system-on-chip device 1222. In some implementations, an input device 1230 and a power supply 1244 are coupled to the system-on-chip device 1222. Moreover, in a particular implementation, as illustrated in FIG. 12, the display 1228, the input device 1230, the speaker 1236, the microphone 1238, the antenna 1242, and the power supply 1244 are external to the system-on-chip device 1222. In a particular implementation, each of the display 1228, the input device 1230, the speaker 1236, the microphone 1238, the antenna 1242, and the power supply 1244 may be coupled to a component of the system-on-chip device 1222, such as an interface or a controller.

The device 1200 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 1232 may include or correspond to a non-transitory computer readable medium storing the instructions 1268. The instructions 1268 may include one or more instructions that are executable by a computer, such as the processor 1210. The instructions 1268 may cause the processor 1210 to perform one or more operations described herein, including but not limited to one or more portions of the method 900 of FIG. 9, the method 1000 of FIG. 10, the method 1100 of FIG. 11, or a combination thereof.

While FIG. 12 illustrates a wireless communication device configured to support aspects of the present disclosure, various other electronic devices may alternatively or additionally support aspects of the present disclosure. For example, one or more components of a base station may support aspects of the present disclosure. A base station may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

Various functions may be performed by one or more components of the base station, such as sending and receiving messages and data (e.g., audio data). The one or more components of the base station may include a processor (e.g., a CPU), a transcoder, a memory, a network connection, a media gateway, a demodulator, a transmission data processor, a receiver data processor, a transmission multiple input-multiple output (MIMO) processor, transmitters and receivers (e.g., transceivers), an array of antennas, or a combination thereof. One or more of the components of the base station may be configured to process spatialized audio data based on movement, as described with reference to FIGS. 1-12.

During operation of a base station, one or more antennas of the base station may receive a data stream from a wireless device. A transceiver may receive the data stream from the one or more antennas and may provide the data stream to the demodulator. The demodulator may demodulate modulated signals of the data stream and provide demodulated data to the receiver data processor. The receiver data processor may extract audio data from the demodulated data and provide the extracted audio data to the processor.

The processor may provide the audio data to the transcoder for transcoding. The decoder of the transcoder may decode the audio data from a first format into decoded audio data and the encoder may encode the decoded audio data into a second format. In some implementations, the encoder may encode the audio data using a higher data rate (e.g., upconvert) or a lower data rate (e.g., downconvert) than received from the wireless device. In other implementations the audio data may not be transcoded. Transcoding operations (e.g., decoding and encoding) may be performed by multiple components of the base station. For example, decoding may be performed by the receiver data processor and encoding may be performed by the transmission data processor. In other implementations, the processor may provide the audio data to the media gateway for conversion to another transmission protocol, coding scheme, or both. The media gateway may provide the converted data to another base station or core network via the network connection.

In conjunction with the described aspects, an apparatus includes means for displaying a visual environment associated with a spatialized audio signal. The means for displaying may include or correspond to the I/O device 114 of FIG. 1, the display device 142 of FIG. 1, the output device 414 of FIG. 4, the projection device 502 of FIG. 5, the windshield 602 of FIG. 6, the multimedia devices 802, 804 of FIG. 8, the display controller 1226, of FIG. 12, the display 1228 of FIG. 12, one or more other structures or circuits configured to display a visual environment associated with a spatialized audio signal, or any combination thereof.

The apparatus includes means for navigating from a first position within the visual environment to a second position within the visual environment at a first speed based on first sensor data. The means for navigating may include or correspond to the processor 104 of FIGS. 1 and 4, the audio/visual program 136 of FIG. 1, the projection device 502 of FIG. 5, the CPU 604 of FIG. 6, the display device 608 of FIG. 6, the audio spatialization circuitry 710 of FIG. 7, the multimedia devices 802, 804 of FIG. 8, the processor 1210 of FIG. 12, one or more other structures or circuits configured to navigate from a first position within a visual environment to a second position within the visual environment at a first speed based on first sensor data, or any combination thereof.

The apparatus further includes means for generating two or more audio frames of a first version of the spatialized audio signal based on a translation distance from a first location of a sound field to a second location of the sound field. The means for generating the two or more audio frames may include or correspond to the processor 104 of FIGS. 1 and 4, the binauralizor 316 of FIG. 3, the CPU 604 of FIG. 6, the audio spatialization circuitry 710 of FIG. 7, the binauralizor 716 of FIG. 7, the multimedia devices 802, 804 of FIG. 8, the processor 1210 of FIG. 12, a filter, one or more other structures or circuits configured to generate two or more frames of a first version of a spatialized audio signal based on a translation distance from a first location of a sound field to a second location of the sound field, or any combination thereof. The first version of the spatialized audio signal may indicate a change in a direction or a distance of the sound field based on navigating to the second location.

In some implementations, the apparatus may include means for generating a first audio output based on the first version of the spatialized audio signal. The means for generating the first audio output may include or correspond to the to the transducers 144 of FIGS. 1 and 4, the pair of headphones 302 of FIG. 3, the speaker array 506 of FIG. 5, the one or more speakers 622 of FIG. 6, the multimedia devices 802, 804 of FIG. 8, the speaker 1236 of FIG. 12, one or more other structures or circuits configured to generate audio output based on spatialized audio, or any combination thereof.

In some implementations, the apparatus may include means for generating the first sensor data. The means for generating the first sensor data may include or correspond to the one or more sensors 102 of FIGS. 1 and 4, the input device 402 of FIG. 4, the sensor device 504 of FIG. 5, the input device 606 of FIG. 6, the multimedia devices 802, 804 of FIG. 8, the input device 1230 of FIG. 12, one or more other structures or circuits configured to generate sensor data, or any combination thereof.

In some implementations, the apparatus may include means for capturing the spatialized audio signal coupled to the means for generating. The means for capturing may include or correspond to the transducers 144 of FIGS. 1 and 4, the input device 606 of FIG. 6, the multi-dimensional microphone 812 of FIG. 8, the microphone array 814 of FIG. 8, the microphone 1238 of FIG. 12, one or more other structures or circuits configured to capture spatialized audio, or any combination thereof.

One or more of the disclosed aspects may be implemented in a system or an apparatus, such as the device 1200, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1200 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-12 may illustrate systems, apparatuses, or methods according to the teachings of the disclosure, the disclosure is not limited to these illustrated systems, apparatuses, or methods. One or more functions or components of any of FIGS. 1-12 as illustrated or described herein may be combined with one or more other portions of another of FIGS. 1-12. Accordingly, no single implementation described herein should be construed as limiting and implementations of the disclosure may be suitably combined without departing form the teachings of the disclosure. As an example, one or more of the method 900 of FIG. 9, the method 1000 of FIG. 10, or the method 1100 of FIG. 11 may be performed by the multimedia device of FIG. 1, the processor 104 of FIGS. 1 and 4, the projection device 502 of FIG. 5, the CPU 604 of FIG. 6, the multimedia device 802, 804 of FIG. 8, or the processor 1210 of FIG. 12. Additionally, one or more operations described with reference to FIGS. 9-11 may be optional, be performed at least partially concurrently, be performed in a different order than shown or described, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A multimedia device to compensate for navigational movement within an environment, the multimedia device comprising a processor configured to:
    obtain data indicating a first speed of movement associated with a change from a first position to a second position detected within a visual environment and a second speed of movement associated with a change from a first location to a second location of a sound field;
    generate a first version of a spatialized audio signal of the sound field in an audio frame based on the first position; and
    generate a second version of the spatialized audio signal in another audio frame based on a compensation for the first speed being different than the second speed.

2. The multimedia device of claim 1, the processor configured to generate the audio frame and the other audio frame, and further comprising one or more sensors configured to generate sensor data indicative of movement from the first position to the second position.

3. The multimedia device of claim 2, wherein the sensor data includes translation data, first orientation data, or both.

4. The multimedia device of claim 1, wherein the first speed indicates movement from the first position to the second position and the second speed indicates movement from the first location to the second location.

5. The multimedia device of claim 1, wherein the first speed is faster than the second speed.

6. The multimedia device of claim 1, wherein the processor is configured to perform the compensation during playback of the spatialized audio signal.

7. The multimedia device of claim 1, further comprising at least two speakers coupled to the processor, the at least two speakers configured to generate an audio output based on the first version and the second version.

8. The multimedia device of claim 7, wherein the audio output includes a binauralized version of the spatialized audio signal, and wherein the binauralized version is played out with the at least two speakers.

9. The multimedia device of claim 7, wherein the processor, one or more sensors configured to generate sensor data indicative of movement of the multimedia device, and the at least two speakers are integrated into a wearable multimedia display device.

10. The multimedia device of claim 1, further comprising an audio output port coupled to the processor and configured to be coupled to an external audio output device, wherein the processor is further configured to provide the first version and the second version to the external audio output device via the audio output port.

11. The multimedia device of claim 1, further comprising one or more microphones coupled to the processor and configured to capture the spatialized audio signal.

12. The multimedia device of claim 1, further comprising a display device configured to display the visual environment.

13. The multimedia device of claim 12, wherein the display device includes one or both of a virtual reality head mounted display and an augmented reality head mounted display.

14. The multimedia device of claim 12, wherein the display device is configured to project images of the visual environment onto a window of a vehicle.

15. The multimedia device of claim 14, wherein two or more speakers are integrated into the vehicle, and wherein the vehicle is configured to receive from a user input device data indicative of movement of the vehicle in the visual environment.

16. The multimedia device of claim 1, wherein the processor is configured to generate the audio frame and the other audio frame to provide different spatialized audio experiences for different movement speeds.

17. The multimedia device of claim 1, further comprising a memory configured to store first audio adjustment data corresponding to a first movement speed and second audio adjustment data corresponding to a second movement speed, and wherein the processor is further configured to generate the audio frame using the first audio adjustment data to provide a first spatialized movement experience and the other audio frame using the second audio adjustment data to provide a second spatialized movement experience.

18. The multimedia device of claim 17, wherein the first movement speed corresponds to a walking speed and the first spatialized movement experience corresponds to a walking experience, and wherein the second movement speed corresponds to a driving speed and the second spatialized movement experience corresponds to a driving experience.

19. The multimedia device of claim 17, wherein the first movement speed corresponds to one of a walking speed, a running speed, a bicycling speed, a driving speed, or a flying speed, and wherein the second movement speed corresponds to another one of the walking speed, the running speed, the bicycling speed, the driving speed, or the flying speed.

20. The multimedia device of claim 17, wherein the first audio adjustment data and the second audio adjustment data are indexed by translation index values.

21. The multimedia device of claim 17, wherein the second audio adjustment data is associated with rotation of the second version of the sound field, translation of the second version of the sound field, or both rotation of the second version of the sound field and translation of the second version of the sound field.

22. The multimedia device of claim 1, wherein the spatialized audio signal is formatted in accordance with a higher order ambisonic (HOA) format, and wherein the processor is configured to generate the compensation based on a transformation matrix.

23. The multimedia device of claim 1, wherein the spatialized audio signal is formatted in accordance with an audio channel format or an audio object-based format.

24. The multimedia device of claim 1, further comprising a mixer coupled to the processor and configured to mix the second version with a second audio signal, wherein the second audio signal includes a stereo audio signal or a mono audio signal.

25. A method of compensating for navigational movement within an environment, the method comprising:
    determining a first speed of movement associated with at least a first location of a sound field and determining a second speed of movement associated with at least the first location and a second location of the sound field;
    generating, at a processor, based on the first speed, one or more audio frames of a first version of a spatialized audio signal to provide a first spatialized audio experience associated with the first speed; and generating, at the processor, based on the second speed, one or more audio frames of a second version of the spatialized audio signal to provide a second spatialized audio experience associated with the second speed.

26. The method of claim 25, further comprising initiating a playback of the spatialized audio signal and compensating, during the playback and based on a transformation matrix, for a third speed of movement from a first position within a visual environment to a second position within the visual environment differing from the second speed.

27. The method of claim 25, wherein the first speed corresponds to a walking speed and the first spatialized audio experience corresponds to a walking experience, and wherein the second speed corresponds to a driving speed and the second spatialized audio experience corresponds to a driving experience.

28. The method of claim 25, further comprising generating, at two or more speakers, a first audio output based on the first version and a second audio output based on the second version.

29. An apparatus to compensate for navigational movement within an environment, the apparatus comprising:
  means for obtaining data indicative of a first speed of movement associated with a change from a first position to a second position detected within a visual environment and a second speed of movement associated with a change from a first location to a second location of a sound field; and
  means for generating a first version of a spatialized audio signal of the sound field in an audio frame, based on the first position, and a second version of the spatialized audio signal in another audio frame, based on a compensation for the first speed being different than the second speed.

30. A non-transitory computer readable medium storing instructions that, when executed by a processor, cause the processor to perform operations to compensate for navigational movement within an environment, the operations comprising:
  obtaining data indicating a first speed of movement associated with a change from a first position to a second position detected within a visual environment and a second speed of movement associated with a change from a first location to a second location of a sound field; and
  generating a first version of a spatialized audio signal of the sound field in an audio frame, based on the first position, and generating a second version of the spatialized audio signal in another audio frame, based on a compensation for the first speed being different than the second speed.

* * * * *